(12) United States Patent
Bacon

(10) Patent No.: US 10,891,626 B2
(45) Date of Patent: Jan. 12, 2021

(54) SYSTEMS AND METHODS FOR IDENTITY VERIFICATION

(71) Applicant: LexisNexis Risk Solutions Inc., Alpharetta, GA (US)

(72) Inventor: Marc Bacon, Norcross, GA (US)

(73) Assignee: LexisNexis Risk Solutions Inc., Alpharetta, GA (US)

( * ) Notice: Subject to any disclaimer, the term of this patent is extended or adjusted under 35 U.S.C. 154(b) by 433 days.

(21) Appl. No.: 15/373,681

(22) Filed: Dec. 9, 2016

(65) Prior Publication Data

US 2018/0165686 A1 Jun. 14, 2018

(51) Int. Cl.
| | |
|---|---|
| *G06Q 20/40* | (2012.01) |
| *G06F 21/62* | (2013.01) |
| *G06F 16/9535* | (2019.01) |
| *G06F 21/34* | (2013.01) |

(52) U.S. Cl.
CPC ..... *G06Q 20/4097* (2013.01); *G06F 16/9535* (2019.01); *G06F 21/34* (2013.01); *G06F 21/6245* (2013.01); *G06Q 20/409* (2013.01); *G06Q 20/4014* (2013.01)

(58) Field of Classification Search
CPC . G06Q 20/4097; G06F 21/34; G06F 16/9536; G06F 16/9538; G06F 21/6245
See application file for complete search history.

(56) References Cited

U.S. PATENT DOCUMENTS

| | | | | |
|---|---|---|---|---|
| 8,661,026 | B2* | 2/2014 | Bayliss | G06F 16/24578 |
| | | | | 707/722 |
| 9,038,886 | B2* | 5/2015 | Hammad | G06F 21/34 |
| | | | | 235/375 |
| 9,189,505 | B2* | 11/2015 | Bayliss | G06F 16/24578 |
| 9,380,057 | B2* | 6/2016 | Knauss | G06F 16/9535 |
| 2004/0133561 | A1* | 7/2004 | Burke | G06Q 10/107 |
| 2012/0018506 | A1* | 1/2012 | Hammad | G06F 21/34 |
| | | | | 235/375 |
| 2013/0036058 | A1* | 2/2013 | Kelly | G06Q 20/322 |
| | | | | 705/67 |

(Continued)

*Primary Examiner* — Peter Ludwig
*Assistant Examiner* — Michael Jared Walker
(74) *Attorney, Agent, or Firm* — Troutman Pepper Hamilton Sanders LLP; James E. Schutz; Mark Lehi Jones

(57) ABSTRACT

Systems and methods are disclosed for identity authentication using credit card information supplied by a subject with independently determined address information. According to an example implementation, a method is provided that can include receiving, from a client, personally identifying information (PII) related to a subject, where the PII includes at least a subject-supplied name and subject-supplied credit card information. The method can include querying one or more public or private databases with the PII, and receiving, in response to the querying, independent occupancy address information related to the subject. The method can include requesting credit card verification from an authorizing entity, where the requesting includes sending the subject-supplied credit card information and the independent occupancy address information to the authorizing entity. The method can include generating a pass/fail indication responsive to verification information received from the authorizing entity, and sending the pass/fail indication to the client.

18 Claims, 8 Drawing Sheets

(56) References Cited

U.S. PATENT DOCUMENTS

| | | | |
|---|---|---|---|
| 2013/0191898 A1* | 7/2013 | Kraft | G06F 21/31 726/6 |
| 2014/0089989 A1* | 3/2014 | Farb | H04N 21/26241 725/60 |
| 2014/0379600 A1* | 12/2014 | Chapa | G06Q 30/04 705/325 |
| 2015/0295906 A1* | 10/2015 | Ufford | H04L 9/321 726/6 |
| 2015/0348187 A1* | 12/2015 | McCarl | G06Q 40/025 705/38 |
| 2016/0057146 A1* | 2/2016 | Little | G06F 16/9535 726/6 |
| 2016/0086262 A1* | 3/2016 | Straub | G06Q 50/265 705/38 |
| 2016/0125412 A1* | 5/2016 | Cannon | G06Q 20/4014 705/44 |
| 2016/0269411 A1* | 9/2016 | Malachi | H04L 63/10 |
| 2016/0277393 A1* | 9/2016 | Fan | H04L 9/32 |
| 2016/0283740 A1* | 9/2016 | Roundtree | G06F 21/6245 |

* cited by examiner

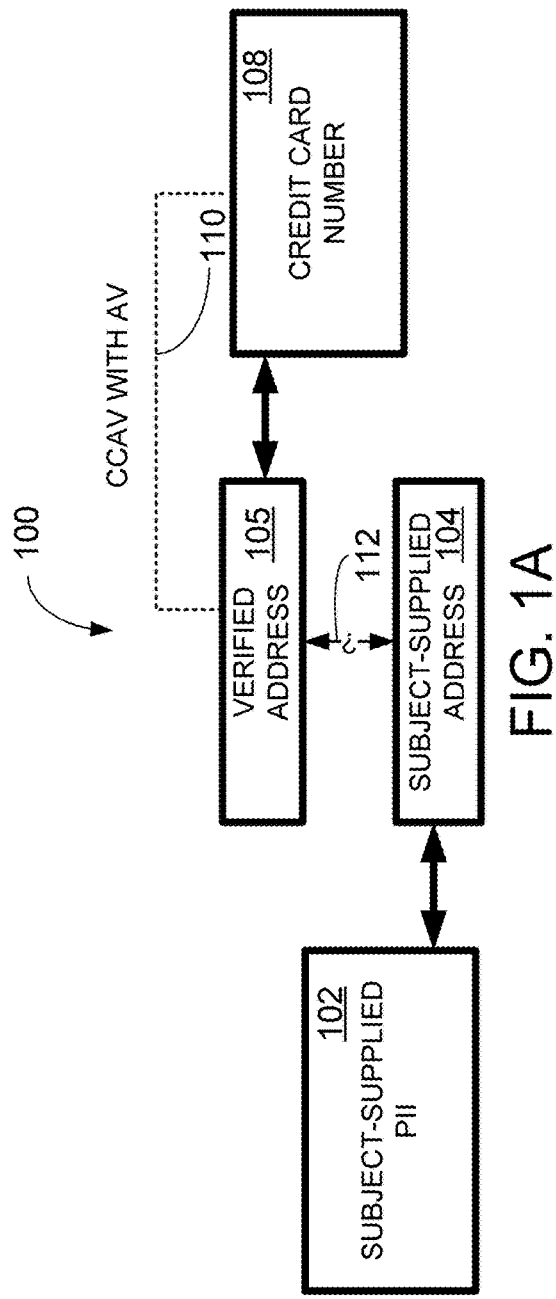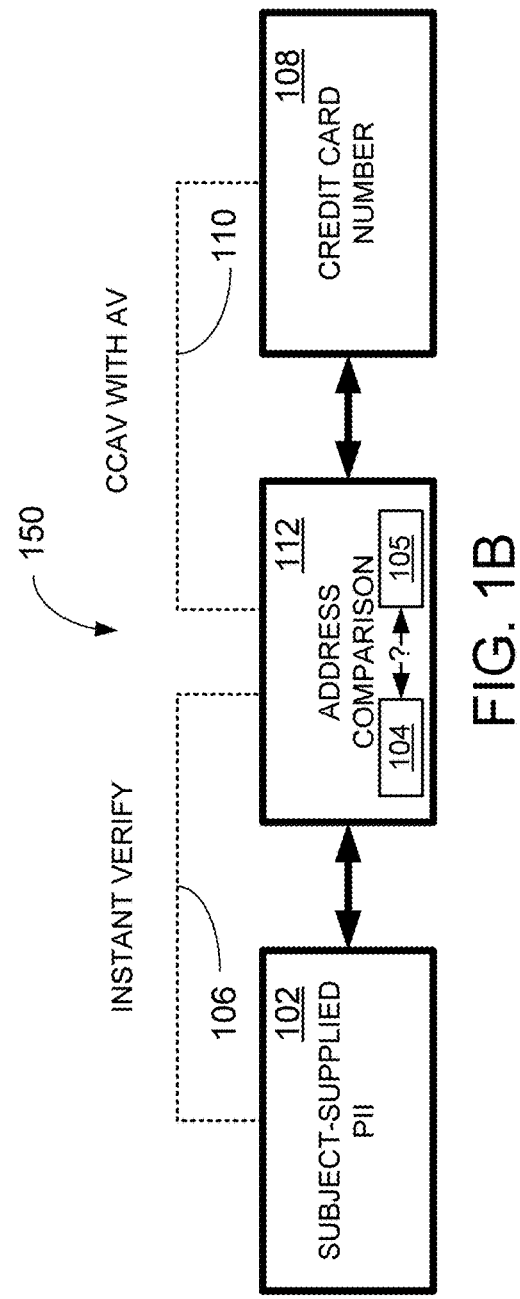

SYSTEMS AND METHODS FOR IDENTITY VERIFICATION

CROSS REFERENCE TO RELATED APPLICATIONS

This application is related to the following U.S. patents and patent applications:

U.S. patent application Ser. No. 14/290,111 entitled "Systems and Methods for Determining Occupancy" filed 29 May 2014, and published as U.S. Patent Application Publication No. US2015/0348187 on 3 Dec. 2015;

U.S. patent application Ser. No. 15/248,244 entitled "Systems and Methods for Detecting Entity Migration" filed 26 Aug. 2016;

U.S. patent application Ser. No. 15/238,035 entitled "Systems and Methods for Improved KBA Identity Authentication Questions" filed 16 Aug. 2016;

U.S. patent application Ser. No. 14/446,007 entitled "Systems and Methods for Combined OTP and KBA Identity Authentication" filed 29 Jul. 2014, and issued as U.S. Pat. No. 9,380,057 on 28 Jun. 2016;

U.S. patent application Ser. No. 15/166,300 entitled "Systems and Methods for Combined OTP and KBA Identity Authentication" filed 27 May 2016, and published as U.S. Patent Application Publication No. US2016/0277393 on 22 Sep. 2016;

U.S. patent application Ser. No. 14/949,140 entitled "Systems and Methods for Increasing Efficiency in the Detection of Identity-Based Fraud Indicators" filed 23 Nov. 2015, and published as U.S. Patent Application Publication No. US2016/0086262 on 24 Mar. 2016.

U.S. patent application Ser. No. 12/496,948 entitled "Entity Representation identification using Entity Level Information" filed 2 Jul. 2009, and issued as U.S. Pat. No. 8,661,026 on 25 Feb. 2014.

U.S. patent application Ser. No. 12/852,612 entitled "System of and Method for Entity Representation Splitting Without the Need for Human Interaction" filed 9 Aug. 2010, and issued as U.S. Pat. No. 9,189,505 on 17 Nov. 2015. The contents of each of the above-referenced applications are incorporated by reference in their entirety as if fully set forth herein.

BACKGROUND

Identity theft is becoming easier to perpetrate in today's increasingly digital environment. Organizations need a reliable way to verify self-provided data when interacting with a customer, vendor, or partner. A number of challenges exist for verifying that the identity presented is real, that the data points resolve consistently to a single identity, and that indications of potential fraud (such as a social security number that belongs to a deceased individual) may be detected.

Strong identity verification helps mitigate fraud and regulatory compliance risks, and can contribute to faster, more accurate account setup and associated interactions with authenticated entities. Verification also helps pinpoint and resolve potential discrepancies that can create bad information and/or record duplication.

In some verification processes, a two-factor authentication is utilized as the minimum standard for confirming an identity. Two-factor authentication includes at least two of the following: something you know (passwords, PINs, and/or knowledge-based authentication quizzes); and something you have (a token, a passcard, and/or possession of a device).

In some authentication processes, dynamic knowledge based authentication (KBA) quizzes can enhance the verification process by retrieving customer information from proprietary and/or public records to ask questions that only an individual with personal knowledge could accurately answer. Additional form factors, such as a one-time password (OTP), may be utilized to let users authenticate themselves using their existing hardware, instead of requiring additional tokens. A need exists for additional verification processes for authenticating a subject using personally identifiable information that is readily available to the subject, without requiring traditional two-factor authentication, KBA quizzes, one-time passwords, or additional hardware.

BRIEF SUMMARY

Some or all of the above needs may be addressed by one or more of the example embodiments disclosed herein. Certain implementations may include systems and methods for verifying whether credit card information associated with a subject corresponds to occupancy data associated with the subject. In certain example implementations, the credit card information may be utilized to determine validity of the subject's current address, and/or other PII.

According to an example implementation, a method is provided. The method includes receiving, from a client, personally identifying information (PII) related to a subject, where the PII includes at least a subject-supplied name and subject-supplied credit card information. The method can include querying one or more public or private databases with the PII, and receiving, in response to the querying, independent occupancy address information related to the subject. The method can include requesting credit card verification from an authorizing entity, where the requesting includes sending the subject-supplied credit card information and the independent occupancy address information to the authorizing entity. The method can include generating a pass/fail indication responsive to verification information received from the authorizing entity, and sending the pass/fail indication to the client.

According to another example implementation, a system is provided. The system includes a memory for storing data and computer-executable instructions; and at least one processor configured to access the memory, wherein the at least one processor is further configured to execute the computer-executable instructions to cause the system perform a method, which includes receiving, from a client, personally identifying information (PII) related to a subject, where the PII includes at least a subject-supplied name and subject-supplied credit card information. The method can include querying one or more public or private databases with the PII, and receiving, in response to the querying, independent occupancy address information related to the subject. The method can include requesting credit card verification from an authorizing entity, where the requesting includes sending the subject-supplied credit card information and the independent occupancy address information to the authorizing entity. The method can include generating a pass/fail indication responsive to verification information received from the authorizing entity, and sending the pass/fail indication to the client.

According to another example implementation, a non-transient computer-readable medium is provided for storing instructions, that when executed by a user device having one or more processors, cause the one or more processors to perform a method. The method includes receiving, from a client, personally identifying information (PII) related to a subject, where the PII includes at least a subject-supplied name and subject-supplied credit card information. The method can include querying one or more public or private databases with the PII, and receiving, in response to the querying, independent occupancy address information related to the subject. The method can include requesting credit card verification from an authorizing entity, where the requesting includes sending the subject-supplied credit card information and the independent occupancy address information to the authorizing entity. The method can include generating a pass/fail indication responsive to verification information received from the authorizing entity, and sending the pass/fail indication to the client.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein:

FIG. 1A is a block diagram of an illustrative process 100 for verifying personally identifiable information provide by a subject, according to an example implementation of the disclosed technology.

FIG. 1B is a block diagram of another illustrative process 150 for verifying personally identifiable information (PII) provide by a subject, according to another example implementation of the disclosed technology.

DETAILED DESCRIPTION

Figure 2:
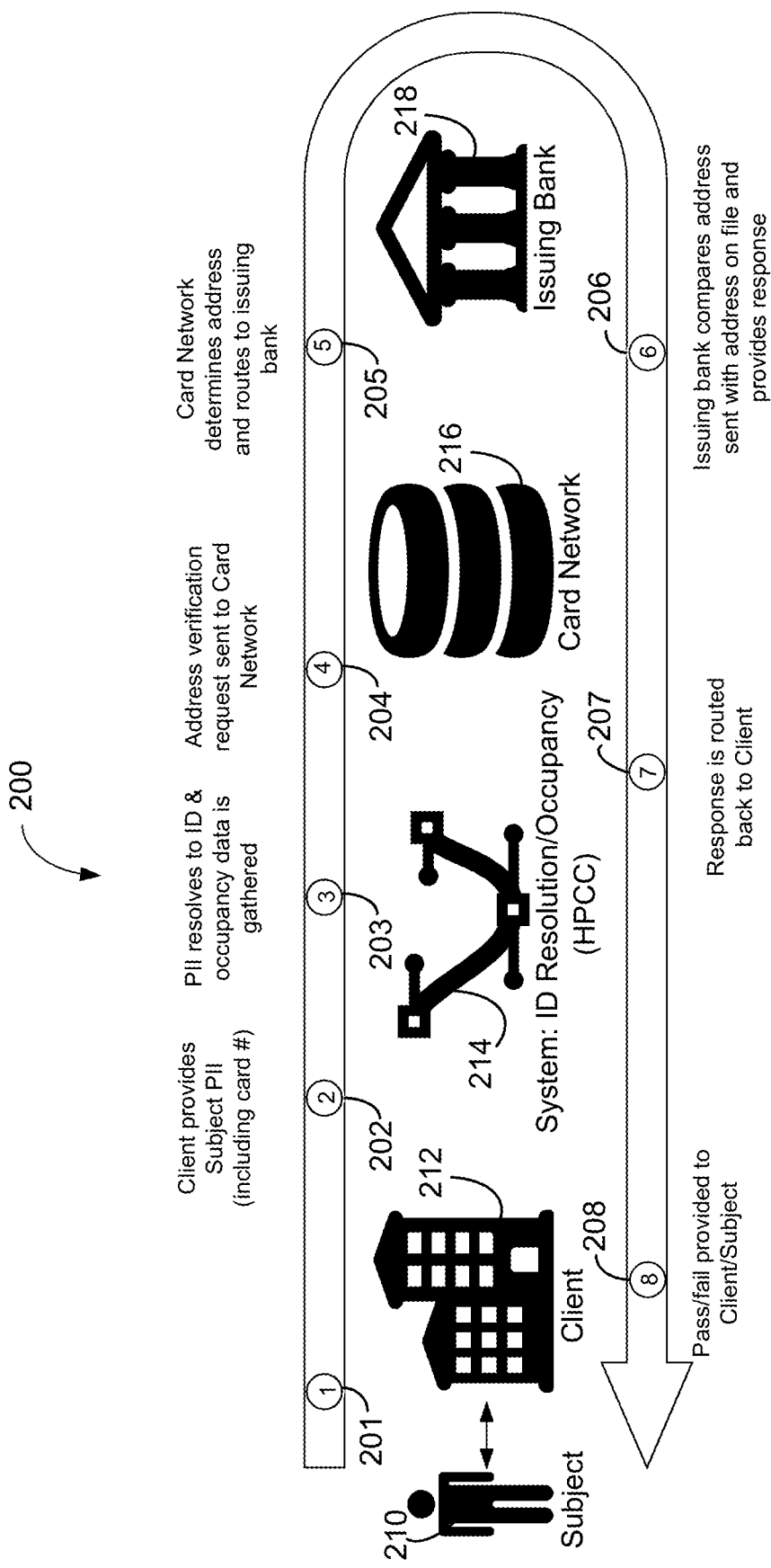
FIG. 2 is a block diagram of an identity verification process 200, according to an example implementation of the disclosed technology.

Certain example implementations of the disclosed technology may be used to enhance identity verification of a person using personally identifiable information, without requiring traditional two-factor authentication, KBA quizzes, one-time passwords, or additional hardware. The disclosed technology may be practiced in many different forms and should not be construed as limited to the implementations set forth herein.

Some implementations of the disclosed technology include systems and methods for verifying the identity of a particular person (hereinafter, referred to as a "subject") using personally identifiable information (PII) received from the subject. In particular, and according to an example implementation of the disclosed technology, the PII can include credit card information, which may be utilized to determine the validity of at least some of the other subject-supplied PII (such as a current residence address of the subject). In accordance with an example implementation of the disclosed technology, the verified consistency of the subject-provided PII and the independently determined PII may be used as a basis for identity verification.

In accordance with an example implementation of the disclosed technology, certain personally identifiable information (PII) may be utilized to cross-check and verify consistency of other PII. For example, the subject-supplied PII can include information such as a name, address, phone number, social security number, credit card number, credit card expiration date, etc. In one example implementation, credit card information may be utilized as a relatively strong identity element that is tied to a particular subject. For example, a subject is likely to be misrepresenting their identity if they cannot provide credit card information that is tied to their current address.

Although a stolen credit card may be used for making a fraudulent purchase, certain embodiments of the disclosed technology utilize the credit card information as a new identity element to strengthen identity verification, rather than for preventing unauthorized purchases.

When a cardholder realizes that their credit card has been stolen, misplaced, lost, or otherwise compromised, the credit card is typically immediately canceled by the cardholder to prevent unauthorized use. It is possible that information printed on the credit card (such as the credit card number, expiration date, name, and CVV number) can be obtained and used for fraudulent purposes, but a cardholder's address is not typically printed on the credit card, therefore it may be difficult (if not impossible) for a fraudster to determine the verified address associated with the credit card. There are exceptions, particularly in situations involving fraudulent activity by a neighbor, relative, or associate who may know the cardholder's address and/or other PII. However, certain example implementations of the disclosed technology may be applied to identity verification processes in which a fraudster may not have access to both the credit card information and the associated address information.

Certain example implementations of the disclosed technology may be used to verify a subject's ownership of a credit card. The associated cross-check of subject-supplied address information with the address associated with the credit card may be utilized as a basis for identity verification, according to an example implementation of the disclosed technology, and will be described more fully hereinafter with reference to the accompanying drawings.

FIG. 1A is a simplified block diagram of an illustrative process 100 for verifying an identity of a subject based on subject-supplied PII 102, which can include a subject-supplied address 104 and credit card number 108. Certain example implementations may rely on a combination of internal occupancy data and billing data of the credit card issuer for credit card account verification (CCAV) with address verification (AV) 110, for example, to link the subject's credit card number 108 to a verified current address 105 of the subject. In one example implementation, the subject-supplied address 104 may be compared 112 with the verified address 105, and if the addresses 104 105 do not match, the process 100 may deny the subject's request for access.

FIG. 1B is a block diagram of another illustrative process 150 for verifying an identity of a subject, based on subject-supplied PII 102 (such as a name, address and credit card number). This example implementation may utilize two independent processes to determine/verify the subject-supplied address 104. In one example implementation, a subject's identity may be determined using a first method, such as instant verify (IV) 106, in which a subject-supplied address 104 can be determined and/or verified. Certain example implementations of the disclosed technology may also rely on a credit card issuer's internal occupancy data and billing data. For example, a second method/process such as credit card account verification (CCAV) with address verification (AV) 110 may be utilized to link the subject's credit card number 108 to a verified current address 105 of the subject. In accordance with an example implementation of the disclosed technology, if the subject-supplied address 104 matches the verified current address 105 returned by the IV 106 and/or the current verified address 105 returned by the CCAV with AV 110, the process 150 may approve the subject's request for access.

FIG. 2 depicts an identity verification process 200 according to an example implementation of the disclosed technology. The identity verification process 200 may be described as including approximately eight general steps 201-208. Some implementations, however, may include additional or fewer steps, as needed.

In one example implementation, the process 200 may begin with the first step 201 in which a subject 210 may interact with a client 212 for example, to conduct business, access information, request goods, request services, etc. The client 212 may be associated with a business, a governmental entity, a website, or any public or private enterprise for which identity authentication of the subject 210 is desired or required. In one example implementation, the subject 210 may provide PII (such as name, address, phone number, social security number, credit card number, credit card expiration date, etc.,) to the client 212 as the initial step 201 in the process 200.

According to an example implementation of the disclosed technology, the second step 202 in the process 200 may include providing the PII to a system 214 that is capable of resolving the identity of the subject 210 and determining and occupancy address of the subject 210. In this example implementation, the PII that is sent from the client 212 to the system 214 includes at least credit card information and enough additional information to determine their identity (such as name, address, phone number, etc.). As will be discussed below, a current residence address provided by the subject 210 may be included in the PII; however, the system 214 may independently determine the subject's address.

In an example implementation, the third step 203 in the process 200 may involve resolving, by the system 214, the received PII to an ID that uniquely identifies the subject 210, and determining occupancy information for the resolved ID. For brevity sake, certain details and processing capabilities of the system 214 have been describe in at least U.S. patents and Patent Application Publication Nos. US2015/0348187, US2016/0086262, U.S. Pat. Nos. 8,661,026, and 9,189,505, which are incorporated herein by reference. Certain example implementations of the system 214 can include a special purpose computer system (for example, HPCC) in combination with a special purpose software linking technology (for example, Scalable Automated Linking Technology), as will be discussed below, and in the APPENDIX.

In accordance with an example implementation of the disclosed technology, the system 214 may be utilized to determine an address of occupancy for the subject 210 using the subject's resolved ID based on internal and/or independent data. In certain example implementations, the internally determined occupancy/address information may be resolved independently and without necessarily requiring completely accurate PII (with associated address information) to be received from the subject 210. According to certain aspects of the disclosed technology, the system 214 may utilize part (or all) of the PII supplied by the subject 210, discard portions of the PII that do not help with ID resolution, scrub some of the PII if errors are detected, and/or eliminate ID duplicates. In certain example implementations, PII supplied by the subject 210 that is consistent with internally and independently determined PII (as determined by the system 214) may provide a higher confidence level for the resolved ID and/or independently determined address/occupancy data. In certain example implementations, one or more predefined requirements may be set, for example, to provide resolved ID and/or occupancy data having confidence level at or above the predefined levels.

In an example implementation, the fourth step 204 in the process 200 may involve requesting address verification from an authorizing entity, such as a credit card network 216. According to an example implementation of the disclosed technology, this step may be performed through a card processor (such as Vantiv, First Data, Tsys, etc.). In one example implementation, the address verification request may be based on the resolved ID as determined in the third step 203. In an example implementation, the address verification request may include the determined occupancy/address data based on the resolved ID. In some example implementations, the resolved ID of the subject 210 may be represented by resolved PII information such as a social security number, telephone number, credit card information, address, etc. In some implementations, the verification request may include all or part of such resolved PII information for positively identifying the subject 210, while being consistent with any requirements dictated by the card network 216 for providing the verification. In some instances, the resolved PII information sent to the card network 216 may need to be encrypted for security and/or compliance purposes. According to a certain example implementation of the disclosed technology, only the address information, card information, and the expiration date may be sent for the address verification portion of the process 200. In accordance with an example implementation of the disclosed technology, the other PII may only be used for determining the subject identity and/or to perform more traditional identity verification (such as Instant Verify).

According to an example implementation of the disclosed technology, the fifth step 205 in the process 200 can include determining and/or retrieving, by the card network 216, an address based on the address verification request (i.e., the address verification request as described above in the fourth step 204). In certain example implementations, the retrieved or determined address may then be sent from the card network 216 to the issuing bank 218 associated with the credit card information.

According to an example implementation of the disclosed technology, the sixth step 206 in the process 200 can include receiving and comparing, by the issuing bank 218, the address sent by the card network 216 with a current address on file at the issuing bank 218, where the current address on file at the issuing bank 218 corresponds to the received credit card information. According to an example implementation of the disclosed technology, a pass indication may be generated by the issuing bank if a match between the received and on-file addresses is determined. Conversely, a fail indication may be generated by the issuing bank if a mismatch between the received and on-file addresses is determined.

In accordance with an example implementation of the disclosed technology, the seventh step 207 in the process 200 can include routing the pass/fail response back to the client 208. In accordance with an example implementation of the disclosed technology, the eighth step 205 in the process 200 can include providing the pass/fail response to the subject 210.

As may be appreciated, the process 200 shown and described above with respect to FIG. 2 may include one or more additional levels of independent address resolution over the simplified processes 100 and 150, as described above with respect to FIG. 1A and FIG. 1B. For example, in the process 200, the comparison of addresses in the sixth step 206 may involve the address on file at the issuing bank 218 and the independently resolved address provided by system 214, which may differ from the address provided by the subject 210. Furthermore, in an example implementation, the comparison of addresses in the sixth step 206 may involve the address on file at the issuing bank 218 and the address provided by the card network 216, which may differ from the address provided by the subject 210 and/or the resolved address provided by the system 214. However, in one example implementation, if the subject-provided address does not match either the address resolved by the system 214 or the address on file at the issuing bank 218, then a fail indication may be generated and sent to the client 212 and/or subject 210.

In accordance with an example implementation of the disclosed technology, it may not be necessary to perform each of the steps 201-208. In some implementations, the steps 201-208 may not need to be performed in the sequential order, as depicted in FIG. 2.

Figure 3:
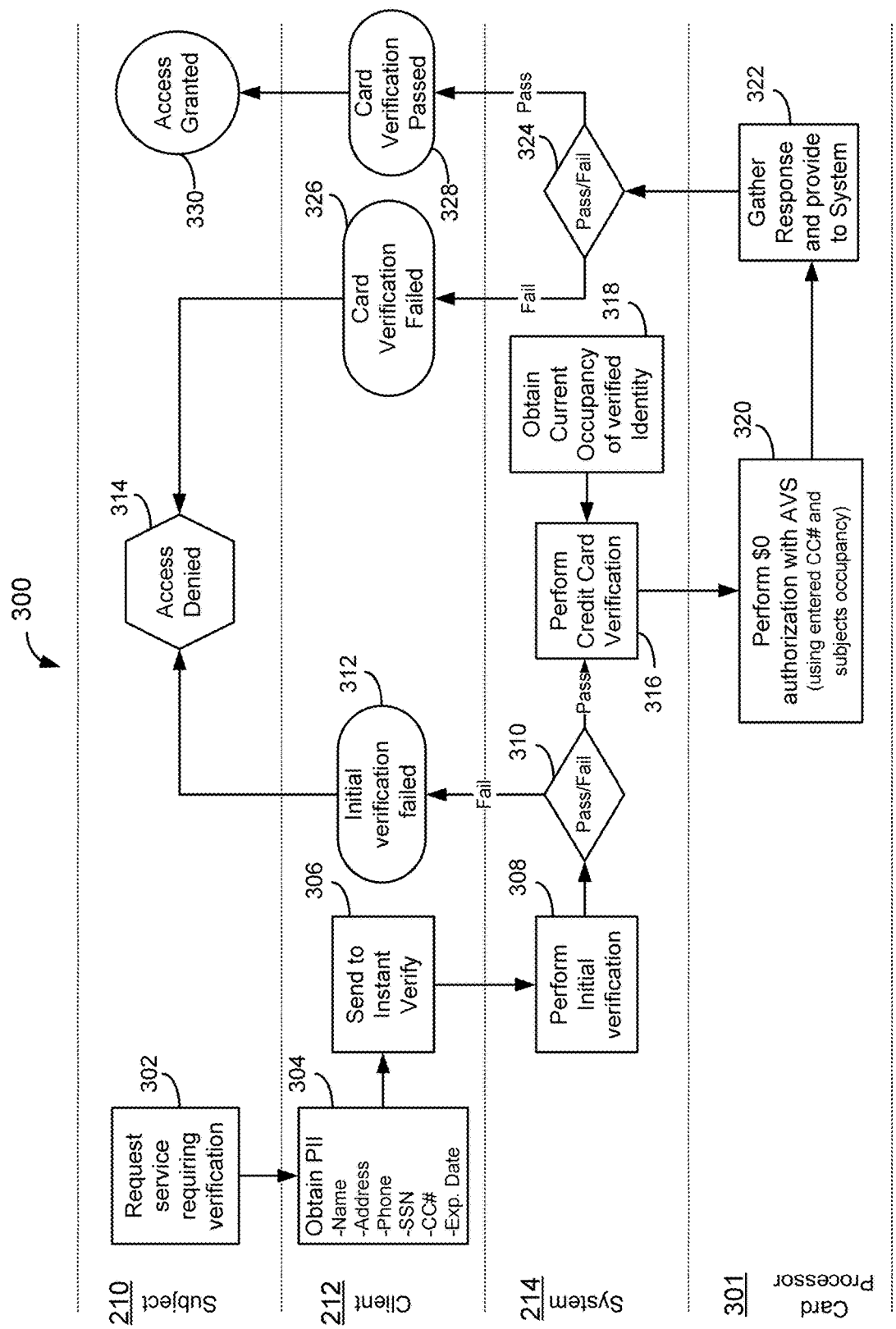
FIG. 3 is a flow chart of an example process 300 for verifying a match between subject-supplied and/or resolved PII, and address information related to the subject's credit card, according to an example implementation of the disclosed technology.

FIG. 3 is a flow chart of an example process 300 for verifying a match between subject-supplied and/or resolved PII, and address information related to the subject's credit card. Certain implementations of the process 300 may be similar to the process 200 as described above with respect to FIG. 2. As indicated in FIG. 3, the example process 300 may utilize one or more authorizing entities (such as a Vantiv ecosystem or other card processor ecosystems 301) for communication with the card network or issuing bank. Vantiv Inc., for example, is a card processor that provides credit card payment processing and technology services to merchants and financial institutions. In certain implementations, interfacing with the card processor ecosystem 301 may provide certain infrastructure and/or processing advantages without relying on communications to/from a traditional credit card network and/or an issuing bank.

In block 302, the process 300 may include receiving, from a subject 210, a request for service requiring verification. For example, the subject 210 may initiate a request to conduct business, access information, request goods, requesting services, etc. In block 304, the client 212 may obtain PII from the subject 210. In block 306, the client 212 may send the subject-provided PII to the system 214 with a request to perform verification. In block 308, the system may receive the request and the associated subject-provide PII and perform an initial verification of the PII. In block 310, the system 214 may analyze the results of the initial verification process. According to an example implementation of the disclosed technology, if the system 214 is unable to substantiate the initial verification, for example, by sufficiently matching the subject-provided PII with independent PII, a fail indication may be sent back to the client 212 in block 312, and passed back to the subject 210, for example, as an indication of access denial 314. However, if the system 214 is able to sufficiently match the subject-provided PII with independent PII, then a credit card verification process may proceed in block 316. In block 318, the system 214 may obtain current occupancy/address information associated with the verified identity of the subject 210. As discussed previously, this occupancy/address information may be derived from information obtained independent of the subject 210.

In block 316, and according to an example implementation of the disclosed technology, the credit card verification process may include sending a $0 authorization request to card processor ecosystem 301 with the subject-supplied credit card information and the independently derived occupancy/address information. In block 320, the card processor ecosystem 301 may receive this request and information and perform the $0 authorization using the received subject-supplied credit card information and the independently derived occupancy/address information. According to an example implementation of the disclosed technology, the card processor ecosystem 301 may communicate with a credit card network and/or issuing bank, as discussed with respect to FIG. 2.

In block 322, the card processor ecosystem 301 may gather the authorization response and provide this information to the system 214. In block 324, if the card processor ecosystem 301 returns a fail indication, an indication of the card failure may be sent to the client 212 in block 326, and passed back to the subject 210, for example, as an indication of access denial 314. However, if the card processor ecosystem 301 returns a pass indication, an indication of the card verification may be sent to the client 212 in block 328, and passed back to the subject 210, for example, as an indication of access granted 330.

As may be understood, the various blocks of the flow chart 300 are intended to describe an example implementation of the disclosed technology. However, the disclosed technology may be practiced using variants with more or less blocks or steps without departing from the scope of the technology.

In accordance with certain example implementations of the disclosed technology, the system 214 may utilize special-purpose computing systems and custom query language(s) in the processes described herein to provide meaningful results. Given the sheer amount of data to be tracked and analyzed, the special-purpose computing systems and/or custom query language(s) may provide the technological base for enabling certain embodiments disclosed herein.

Certain example implementations of the disclosed technology provide tangible improvements in computer processing speeds, memory utilization, and/or programming languages. In certain example implementations, the improved computer systems disclosed herein may enable analysis of an entire population, such as all known persons in the United States, together with associated activities. The computation of such a massive amount of data, at the scale required to provide effective outlier detection and information, has been enabled by the improvements in computer processing speeds, memory utilization, and/or programming language as disclosed herein. Those with ordinary skill in the art may recognize that traditional methods such as human activity, pen-and-paper analysis, or even traditional computation using general-purpose computers and/or off-the-shelf software, are not sufficient to provide the level of data processing for effective ID resolution and determination of occupancy information. As disclosed herein, the special-purpose computers and special-purpose programming language(s) disclosed herein can provide improved computer speed and/or memory utilization that provide an improvement in computing technology, thereby enabling the disclosed technology.

Certain example implementations of the disclosed technology may be enabled by the use of a special purpose HPCC systems in combination with a special purpose software linking technology called Scalable Automated Linking Technology (SALT). SALT and HPCC, are developed and offered by LexisNexis Risk Solutions, Inc., the assignee of the disclosed technology. HPCC Systems, for example, provide data-intensive supercomputing platform(s) designed for solving big data problems. As an alternative to Hadoop, the HPCC Platform offers a consistent, single architecture for efficient processing. The SALT modules, in conjunction with the HPCC Systems, provides technical improvements in computer processing that enable the disclosed technology and provides useful, tangible results that may have previously been unattainable. For example, certain example implementation of the disclosed technology may process massive data sets, which are computationally intensive, requiring special software and hardware.

In accordance with certain example implementations, linking of records may be performed by certain additional special programming and analysis software. For example, record linking and resolution fits into a general class of data processing known as data integration, which can be defined as the problem of combining information from multiple heterogeneous data sources. Data integration can include data preparation steps such as parsing, profiling, cleansing, normalization, and parsing and standardization of the raw input data prior to record linkage to improve the quality of the input data and to make the data more consistent and comparable (these data preparation steps are sometimes referred to as ETL or extract, transform, load).

Some of the details for the use of SALT are included in the APPENDIX section of this application. According to an example implementation of the disclosed technology, SALT can provide data profiling and data hygiene applications to support the data preparation process. In addition, SALT provides a general data ingest application, which allows input files to be combined or merged with an existing base file. SALT may be used to generate a parsing and classification engine for unstructured data, which can be used for data preparation. The data preparation steps are usually followed by the actual record linking or clustering process. SALT provides applications for several different types of record linking including internal, external, and remote.

Data profiling, data hygiene and data source consistency checking, while key components of the record linking process, have their own value within the data integration process and may be supported by SALT for leverage even when record linking is not a necessary part of a particular data work unit.

SALT uses advanced concepts such as term specificity to determine the relevance/weight of a particular field in the scope of the linking process, and a mathematical model based on the input data, rather than the need for hand coded user rules, which may be key to the overall efficiency of the method.

Certain example implementations may utilize SALT to prevent fraud by verifying identities, addresses and other factors. Certain example implementations may utilize determined relationship information to detect collusive activities.

Certain implementations of the disclosed technology may enable an estimation of the likelihood that a subject (such as an owner or other entity associated with a residence) is actually occupying and/or living at a particular residence. According to certain example implementations of the disclosed technology, basic information such as the subject's name and the property street address may be utilized to query one or more public or private databases to obtain subject and property information. In certain example implementations, an investigation date may be specified with time or date in the past, for example, to allow a historical evaluation of occupancy. Certain implementations of the disclosed technology may analyze the subject and property information, not only from the perspective of the subject of interest, but also from the perspective of other persons who have lived at the property previously, for example, to detect activities indicative of the previous occupier moving to a new residence. Certain embodiments of the disclosed technology may analyze related information, such as utility connects, disconnects, and associated addresses and names to detect such activities.

Computer-implemented systems and methods are disclosed herein to obtain and process subject and property information to estimate the likelihood of occupancy of a particular residence property by a particular subject. In certain example implementations of the disclosed technology, indicators of occupancy may be determined from available public and/or private information that may indicate whether the subject moved in to the residence, whether a previous resident moved out of the residence, whether the subject moved out of a prior residence, whether someone other than the subject moved in to the residence, whether activities of the subject are indicative of occupancy of the residence, and/or whether the activities of the subject are indicative of occupancy of another residence. In certain example implementations of the disclosed technology, public and/or private information may be utilized to determine if the residence property is a newly built structure, and in such cases, the detection of a previous resident moving out may not be relevant.

Certain embodiments of the disclosed technology may also utilize public and/or private information to detect certain activities of relatives or associates of a particular subject that may be relevant to the detection of occupancy.

Figure 4:
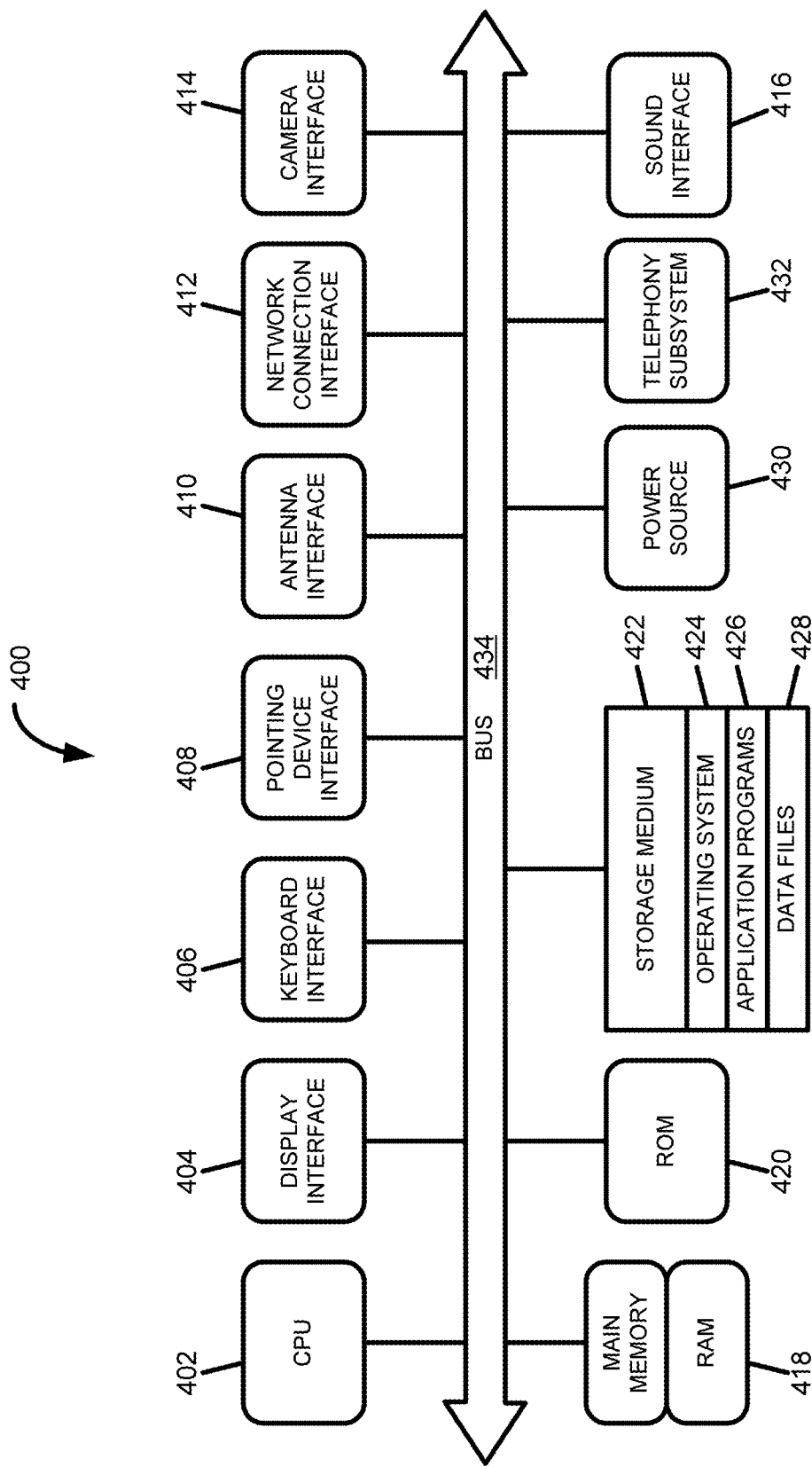
FIG. 4 is an example block diagram of an example computer processing system 400, according to an example implementation.

FIG. 4 depicts a computing device or computing device system 400, according to various example implementations of the disclosed technology. It will be understood that the computing device 400 is provided for example purposes only and does not limit the scope of the various implementations of the communication systems and methods. In certain example implementations, the computing device 400 may be a specialized HPCC Systems, as developed and offered by LexisNexis Risk Solutions, Inc., the assignee of the disclosed technology. HPCC Systems, for example, provide data-intensive supercomputing platform(s) designed for solving big data problems. Various implementations and methods herein may be embodied in non-transitory computer readable media for execution by a processor.

The computing device 400 of FIG. 4 includes a central processing unit (CPU) 402, where computer instructions are processed; a display interface 404 that acts as a communication interface and provides functions for rendering video, graphics, images, and texts on the display. In certain example implementations of the disclosed technology, the display interface 404 may be directly connected to a local display, such as a touch-screen display associated with a mobile computing device. In another example implementation, the display interface 404 may be configured for providing data, images, and other information for an external/remote display that is not necessarily physically connected to the mobile computing device. For example, a peripheral device monitor may be utilized for mirroring graphics and other information that is presented on a wearable or mobile computing device. In certain example implementations, the display interface 404 may wirelessly communicate, for example, via a Wi-Fi channel or other available network connection interface 412 to the external/remote display.

In an example implementation, the network connection interface 412 may be configured as a communication interface and may provide functions for rendering video, graphics, images, text, other information, or any combination thereof on the display. In an example, a communication interface may include a serial port, a parallel port, an input and output port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 400 may include a keyboard interface 406 that provides a communication interface to a keyboard. In an example implementation, the computing device 400 may include a pointing device interface 408, which may provide a communication interface to various devices such as a pointing device, a touch screen, a depth camera, etc.

The computing device 400 may be configured to use an input device via one or more of input/output interfaces (for example, the keyboard interface 406, the display interface 404, the pointing device interface 408, network connection interface 412, camera interface 414, sound interface 416, etc.,) to allow a user to capture information into the computing device 400. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 400 or may be a separate device. For example, the input device may be an accelerometer, a magnetometer, a digital camera, a microphone, and an optical sensor.

Example implementations of the computing device 400 may include an antenna interface 410 that provides a communication interface to an antenna; a network connection interface 412 that provides a communication interface to a network. As mentioned above, the display interface 404 may be in communication with the network connection interface 412, for example, to provide information for display on a remote display that is not directly connected or attached to the system. In certain implementations, a camera interface 414 is provided that acts as a communication interface and provides functions for capturing digital images from a camera. In certain implementations, a sound interface 416 is provided as a communication interface for converting sound into electrical signals using a microphone and for converting electrical signals into sound using a speaker. According to example implementations, a random access memory (RAM) 418 is provided, where computer instructions and data may be stored in a volatile memory device for processing by the CPU 402.

According to an example implementation, the computing device 400 includes a read-only memory (ROM) 420 where invariant low-level system code or data for basic system functions such as basic input and output (I/O), startup, or reception of keystrokes from a keyboard are stored in a non-volatile memory device. According to an example implementation, the computing device 400 includes a storage medium 422 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 424, application programs 426 (including, for example, KEL (Knowledge Engineering Language), a web browser application, a widget or gadget engine, and or other applications, as necessary) and data files 428 are stored. According to an example implementation, the computing device 400 includes a power source 430 that provides an appropriate alternating current (AC) or direct current (DC) to power components. According to an example implementation, the computing device 400 includes and a telephony subsystem 432 that allows the device 400 to transmit and receive sound over a telephone network. The constituent devices and the CPU 402 communicate with each other over a bus 434.

In accordance with an example implementation, the CPU 402 has appropriate structure to be a computer processor. In an arrangement, the computer CPU 402 may include more than one processing unit. The RAM 418 interfaces with the computer bus 434 to provide quick RAM storage to the CPU 402 during the execution of software programs such as the operating system application programs, and device drivers. More specifically, the CPU 402 loads computer-executable process steps from the storage medium 422 or other media into a field of the RAM 418 in order to execute software programs. Data may be stored in the RAM 418, where the data may be accessed by the computer CPU 402 during execution. In an example configuration, the device 400 includes at least 128 MB of RAM, and 256 MB of flash memory.

The storage medium 422 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 400 to access computer-executable process steps, application programs and the like, stored on removable and non-removable memory media, to off-load data from the device 400 or to upload data onto the device 400. A computer program product, such as one utilizing a communication system may be tangibly embodied in storage medium 422, which may comprise a machine-readable storage medium. Certain example implementations may include instructions stored in a non-transitory storage medium in communication with a memory, wherein the instructions may be utilized to instruct one or more processors to carry out the instructions.

According to one example implementation, the term computing device, as used herein, may be a CPU, or conceptualized as a CPU (for example, the CPU 402 of FIG.

4). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

In certain embodiments, the communication systems and methods disclosed herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

Figure 5:
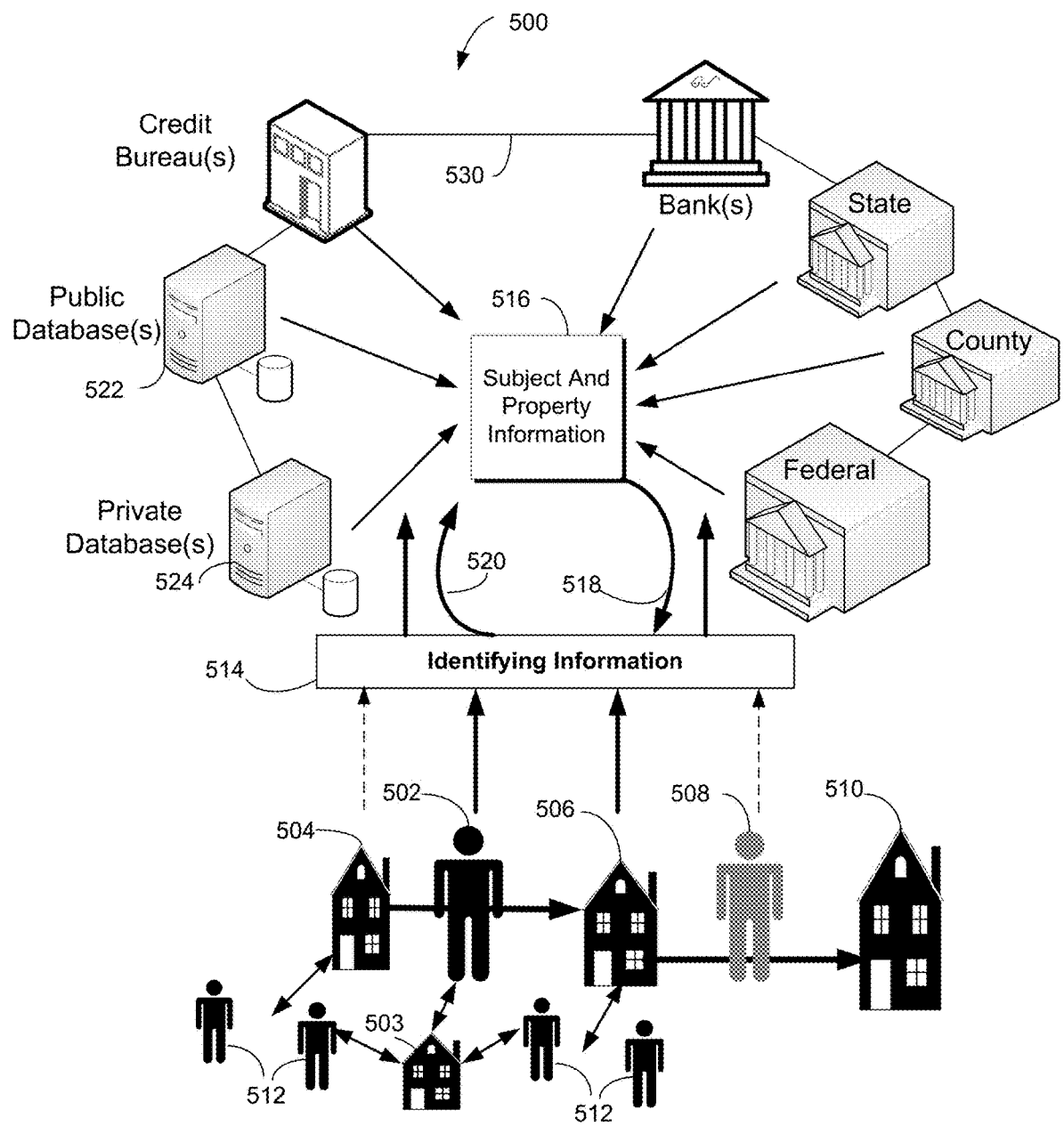
FIG. 5 illustrates a block diagram of an example process 500 for determining occupancy and an address information of a particular residence by a particular subject.

FIG. 5 illustrates a block diagram of an example process 500 for determining occupancy and an address information of a particular residence by a particular subject. Various identifying information may be utilized to retrieve related public and/or private records, and such records may be analyzed to determine occupancy, according to example implementations of the disclosed technology. Certain example implementations of the process 500 may be enabled and/or handled by the ID resolution and occupancy system 214, as discussed above with reference to FIG. 2. Certain example implementations of the process 500 may be enabled by the special-purpose computing systems and custom query language(s), for example HPCC and SALT, as discussed above and in the APPENDIX. In accordance with certain example implementations, certain aspects of the process 500 may be executed on a special-purpose computing device system, such as the computing system 400, as discussed above with respect to FIG. 4.

As illustrated in FIG. 5, and according to an example implementation of the disclosed technology, a subject 502 (which may be the same subject 210 as discussed above with reference to FIGS. 2 and 3) may take ownership of a particular residence 506 (hereinafter, designated as a target property 506), for example, and the subject 502 may move into the target property 506 after moving out of a previous residence 504. In certain cases, a previous occupier or resident 508 of the target property 506 may move out of the target property 506 and into a second property 510. According to certain example embodiments, the subject 502, relatives, or associates 512 may also be involved or associated with a third property 503. For example, the third property 503 could be a rental property, a previous address, an address of relatives or associates 512, etc.

In an example implementation, identifying information 514, such as the name of the subject 502 and an address of the target property 506 may be sufficient to begin the process of determining occupancy of the property 506 by the subject 502. In another example implementation, the identifying information 514 associated with the target property 506 may include an actual or approximate move-in date to specify the date in which the subject 502 first occupied the target property 506. According to certain example embodiments, utility service disconnects and/or other information may be used to corroborate that the subject 502 actually moved out of the previous residence 504, and/or that the previous occupier 508 moved out of the target property 506.

In accordance with an example implementation of the disclosed technology, the one or more public database(s) 522 and/or the private database(s) 524 may store and/or consolidate information from other sources, such as credit bureaus, banks, governmental entities, etc. In certain example embodiments, querying the one or more public database(s) 522 and/or the private database(s) 524 may include querying these other sources. In certain embodiments, the one or more public database(s) 522 and/or the private database(s) 524 may request and receive updated information from the various information sources (credit bureaus, banks, governmental entities, etc.) via one or more communication channels 530.

According to an example implementation of the disclosed technology, various records may be utilized to obtain certain subject and property information 116. Such information may be derived from driver license information, vehicle registration information, utility information, voting information, criminal information, court information, property deed and tax assessment records, other deed information, assessment information, other tax information, sales information, insurance information, etc.

According to an example implementation of the disclosed technology, and in response to the querying the one or more public database(s) 522 and/or the private database(s) 524 with the identifying information 514, subject and property information 516 may be returned for further analysis, for example, to determine one or more indicators of occupancy.

In an example implementation, the returned subject and property information 516 can include as applicable, one or more of the utility records, evidence of commercial transaction behavior by the subject 502 (which may include credit seeking behavior), credit bureau records, property deed and tax assessment records, public records, public records of relatives or associates 512, addresses of relatives or associates 512; and address history of relatives or associates 512. In certain example implementations, the returned subject and property information 516 can further include, as applicable, records of one or more events associated with the address of the target property 506 after the investigation date, one or more current activities associated with the subject 502 at the address of the target property 506, one or more current activities associated with the subject 502 or relatives or associates 512 at a third property 503 having an address that differs from the address of the target property 506, and/or one or more activities of relatives or associates 512 of the subject 502 at the address of the target property 506.

In accordance with an example implementation of the disclosed technology, the one or more indicators of occupancy may provide answers to one or more occupancy-related questions, including but not limited to:
Did the subject 502 move in to the target property 506?
Did a 3rd party or previous resident 508 move out of the target property 506?
Did the subject 502 move-out of a prior residence 504?
Did someone else move into the target property 506?
Are there resident-type activities associated with the subject 502 at an address that differs from the address of the target property 506?
Are there current resident-type activities associated with the subject 502 at the address of the target property 506?
Did the subject 502 update their driver's license information with the address of the target property 506?
Is the target property 506 a newly built residence?

In certain example implementations of the disclosed technology, the answers to the abovementioned occupancy-related questions, alone or in combination with the other indicators of occupancy, may be scored to provide an indication of occupancy of a particular property by a particular subject. In accordance with an example implementation of the disclosed technology, part or all of the process described above with respect to FIG. 5 above may be included or part of the process of obtaining (and reporting) current occupancy, as depicted in block 318 of FIG. 3 for performing credit card verification. As may be appreciated, the various processes discussed with respect to FIG. 5 may enable determination of a current residence address for the subject without relying on receiving such information from the subject.

Figure 6:
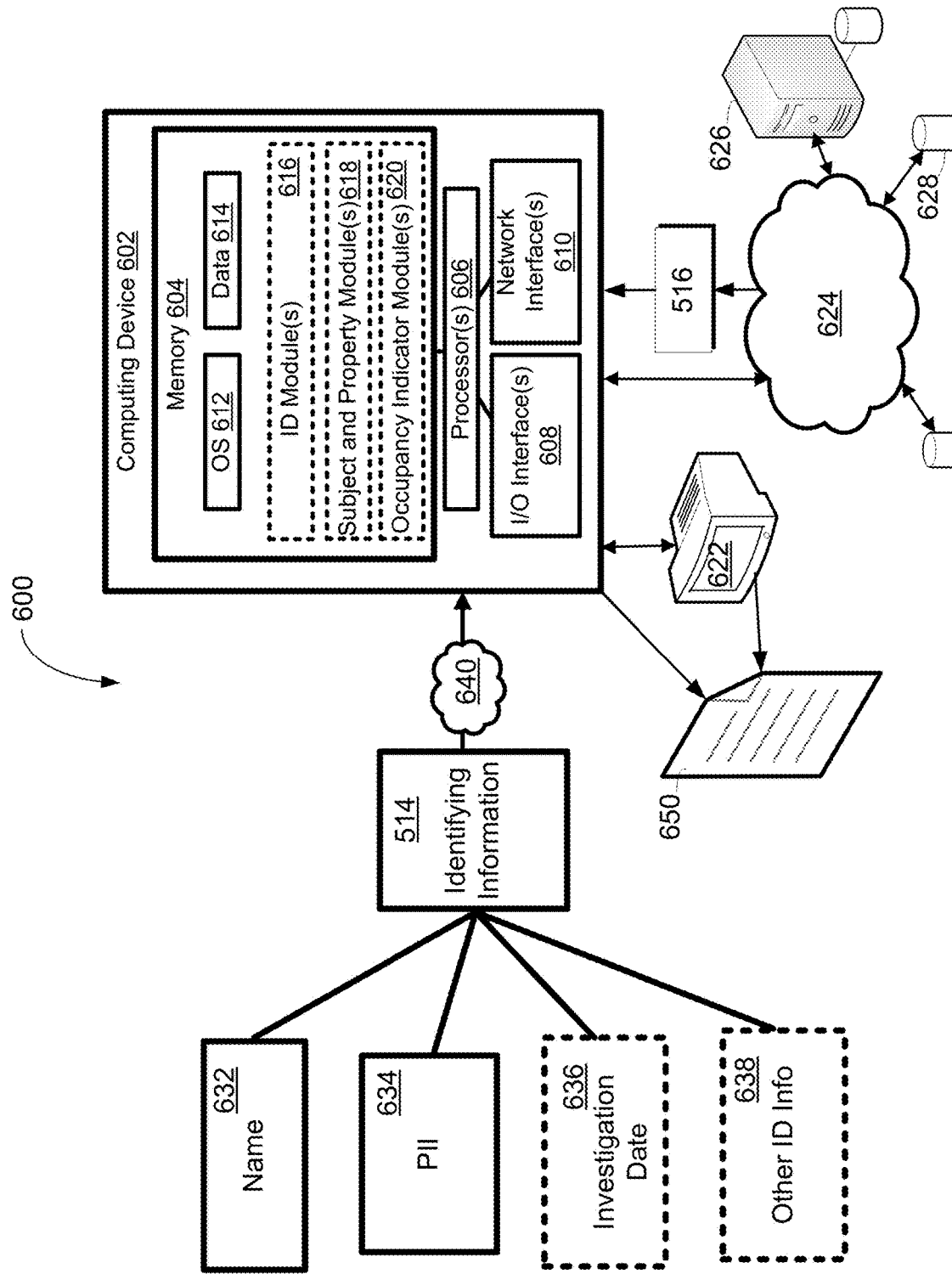
FIG. 6 depicts an illustrative block diagram of a system 600 for determining indicators of occupancy, according to an example implementation of the disclosed technology.

FIG. 6 depicts an illustrative block diagram of a system 600 for determining indicators of occupancy, according to an example implementation of the disclosed technology. The system 600, for example, may be utilized to receive identifying information 514; (process and) use the identifying information 514 to query one or more databases 626 628 via a network, Internet, or cloud 624; receive subject and property information 516 in response to the query; and determine one or more indicators of occupancy (for example, by the occupancy indicator module 620) from the received subject and property information 516.

According to an example implementation of the disclosed technology, the identifying information 514 may be utilized as input, and may include a name 632 of a subject (for example, the subject 502 as depicted in FIG. 5 and/or the subject 210 as depicted in FIG. 2) and PII 634, such as an address of a residence or property (for example the target property 506 of FIG. 5). In certain example implementations, the identifying information 514 may include a move-in date. In certain example implementations, the identifying information may include other identifying information 638, such as a social security number, birth date, etc., for example, to refine the query or improve the returned subject and property information 516.

According to an example implementation, an investigation date 636 may be considered in the occupancy analysis. For example, in certain embodiments, the investigation date may be a specific time or date in the past to allow a historical evaluation of occupancy. In certain example implementations, the investigation date may include range of dates, for example, to capture activity within the range of dates.

In accordance with an example implementation of the disclosed technology, the computing device 602 may include one or more memory(s) 604 (such as RAM, ROM, hard drive storage, etc.), one or more processor(s) 606, an in/out interface 608, and a network interface 610. In an example implementation, the memory 604 may be configured to load an operating system 612 and data. The memory 604 may include one or more modules for processing the data 614. In one example implementation, the memory may include an ID module 616, for example, to format the received identifying information 514 appropriately for the query. In an example implementation, the memory 604 may include a subject and property module 618, for example, to determine if adequate information is returned from the query to be able to score the results with a given confidence.

In an example implementation, and with respect to both FIGS. 5 and 6, the memory 604 may include an occupancy indicator module 620 for determining as applicable, one or more of an indication of activity at an address of a second property 510 by a previous resident 508 of the target property 506, an indication of activity verifying the subject occupancy at the target property 506, an indication of activity verifying non-occupancy by the subject 502 at a previous address 504 associated with the subject 502; and determining, with the one or more computer processors 606, a score 650 based on the one or more indicators of occupancy. The score 650, for example, may represent the likelihood that the subject 502 is actually occupying the target property 506.

According to an example implementation of the disclosed technology, the score 650 determined by the occupancy indicator module 620 may be output, for display on one or more displays 622.

Certain aspects of FIG. 6 may be embodied in non-transitory computer readable media for execution by a processor 606. It will be understood that the computing device 602 is provided for example purposes only and does not limit the scope of the various implementations disclosed herein. In certain example implementations, The computing device 602 includes a central processing unit (CPU) 606, where computer instructions are processed; a display or in/out interface 608 that acts as a communication interface and provides functions for rendering video, graphics, images, and texts on a display 622. In certain example implementations of the disclosed technology, the in/out interface 608 may be directly connected to a local display 622. In another example implementation, the a network interface 610 may be configured for providing data, images, and other information for an external/remote display that is not necessarily physically connected to the computing device 602. For example, a desktop monitor may be utilized for mirroring graphics and other information that is presented on a mobile computing device.

In an example implementation, the network interface 610 may be configured as a communication interface and may provide functions for rendering video, graphics, images, text, other information, or any combination thereof on the local display 622 or any remote display. In one example, the in/out interface 608 may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

According to an example implementation of the disclosed technology, the computing device 602 may be configured to use an input device via one or more of in/out interfaces 608 (for example, a keyboard interface, a display interface, camera interface, sound interface, etc.,) to allow a user to capture information into the computing device 602. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 602 or may be a separate device. For example, the input device may be an accelerometer, a magnetometer, a digital camera, a microphone, and an optical sensor.

Example implementations of the computing device 602 may include an antenna interface that provides a communication interface to an antenna; a network interface 610 that provides a communication interface to a network 624. In certain implementations, a sound interface is provided as a communication interface for converting sound into electrical signals using a microphone and for converting electrical signals into sound using a speaker. According to example implementations, a random access memory (RAM) is provided, where computer instructions and data may be stored in a volatile memory 604 device for processing by the one or more processors 606.

According to an example implementation, the computing device 602 includes a read-only memory (ROM) where invariant low-level system code or data for basic system functions such as basic input and output (I/O), startup, or reception of keystrokes from a keyboard are stored in a non-volatile memory device. According to an example implementation, the computing device 602 includes a storage medium or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 612, application programs (including, for example, a web browser application, a widget or gadget engine, and or other applications, as necessary) and data files 614 are stored. According to an example implementation, the computing device 602 includes a power source that provides an appropriate alternating current (AC) or direct current (DC) to power components. According to an example implementation, the computing device 602 includes and a telephony subsystem that allows the device 602 to transmit and receive sound over a telephone network. The constituent devices and the one or more processors 606 may communicate with each other over a bus.

In accordance with an example implementation, the processor 606 has appropriate structure to be a computer processor. In one arrangement, the processor 606 may include more than one processing unit. The storage medium part of the memory 604 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 602 to access computer-executable process steps, application programs and the like, stored on removable and non-removable memory media, to off-load data from the device 602 or to upload data onto the device 602. A computer program product, such as one utilizing a communication system may be tangibly embodied in storage medium, which may comprise a machine-readable storage medium.

According to one example implementation, the term computing device, as used herein, may be a CPU, or conceptualized as a CPU (for example, the processor(s) 606 of FIG. 6). In this example implementation, the computing device 602 may be coupled, connected, and/or in communication with one or more peripheral devices, such as display 622. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

Figure 7:
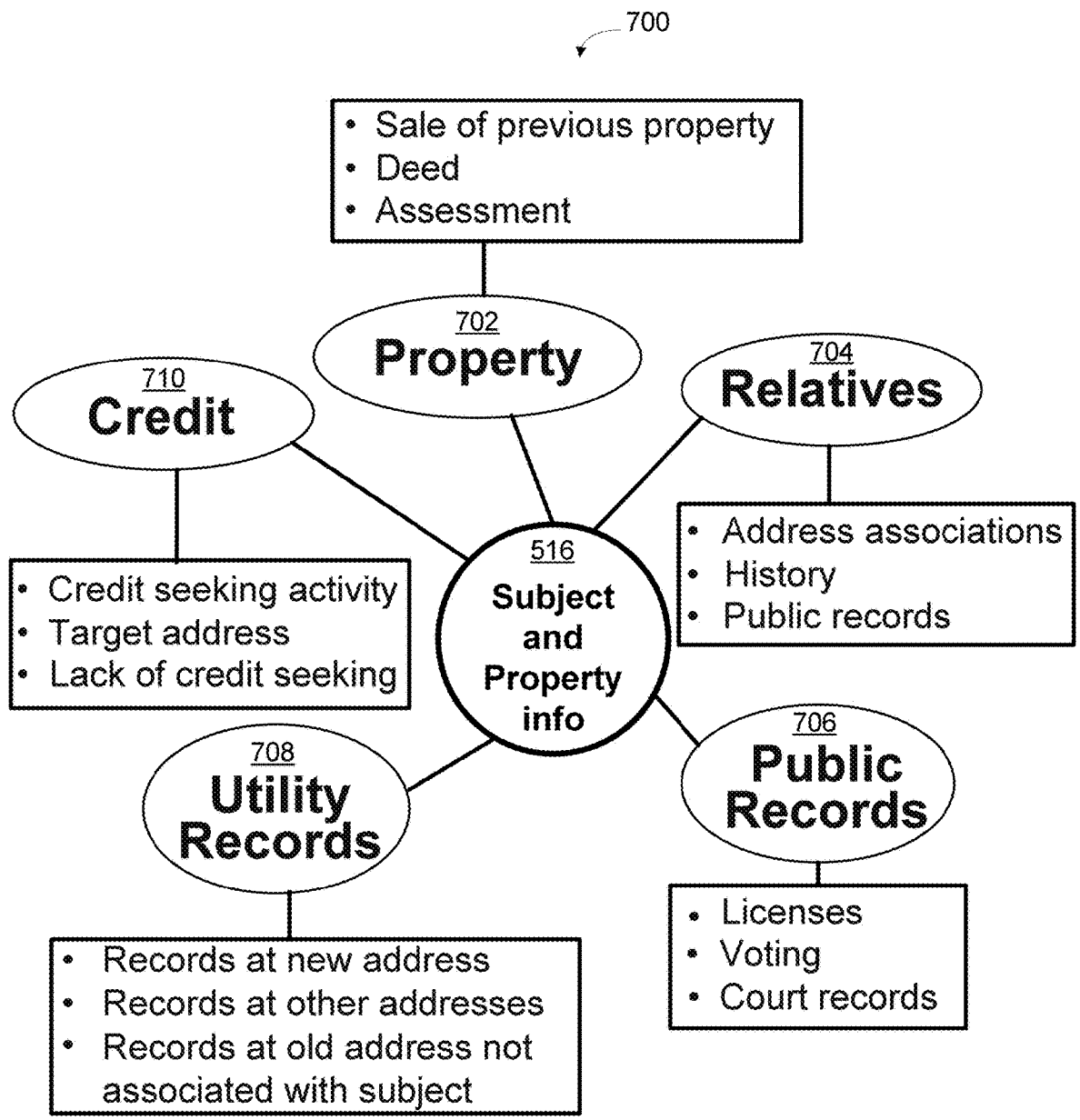
FIG. 7 depicts a block diagram of illustrative information 700 utilized for determining occupancy, according to an example implementation of the disclosed technology.

FIG. 7 depicts a block diagram of illustrative information 700 utilized for determining occupancy, according to an example implementation of the disclosed technology. For example, the subject and property information 516 may be derived from, or may include various records such as: property deed and tax assessment records 702, records of relatives or associates 704, public records 706, utility records 708, and/or credit records 710. For example, the property deed and tax assessment records 702 may include information such a sale of a previous property, purchase of a new property, deed information, assessment information, etc. In certain example implementations, the records of relatives or associates 704 may include address associations of a subject with relatives or associates, an address history of the subject's relatives, various public records that identify relatives, etc. In accordance with an example implementation of the disclosed technology, public records 708 may include information such as professional and business license information, voter registration information, court records, births, marriages, deaths, employment, driving records, criminal records, appraisal records, court dockets, etc.

In accordance with an example implementation of the disclosed technology, utility records 708 may include utility records associated with the various entities and addresses. In certain example implementations, the utility records 708 may be searched and/or processed, for example, to detect utility-related activity of the various entities at a new address or at an address not previously associated with a subject.

In accordance with an example implementation of the disclosed technology, commercial transactions for the subject 710 may be searched and/or processed to detect commercial transaction activity by the subject, and whether the commercial transaction activity is associated with the target property, a second property, a third property, or a previous property. Certain example implementations may further utilize the commercial transaction records 710 to determine if there is a lack of commercial transaction behavior.

In accordance with an example implementation of the disclosed technology, the illustrative information 700 as shown in FIG. 7 represents the type of information that may be included in the subject and property information 516, depending on the availability of the information. Those of skill in the art will recognize that not every subject and/or property will have the same information available, nor will they share the same circumstances, the same history, or even the same accuracy in the available information. Certain embodiments of the disclosed technology may score the indicators of occupancy to provide an indication of the likelihood that the subject is occupying a particular residence, and/or that the subject is associated with a particular address. Certain example implementations may also provide an additional score or grading to indicate the confidence of the output score, for example, based on the quality and/or quantity of the subject and property information that is returned.

Figure 8:
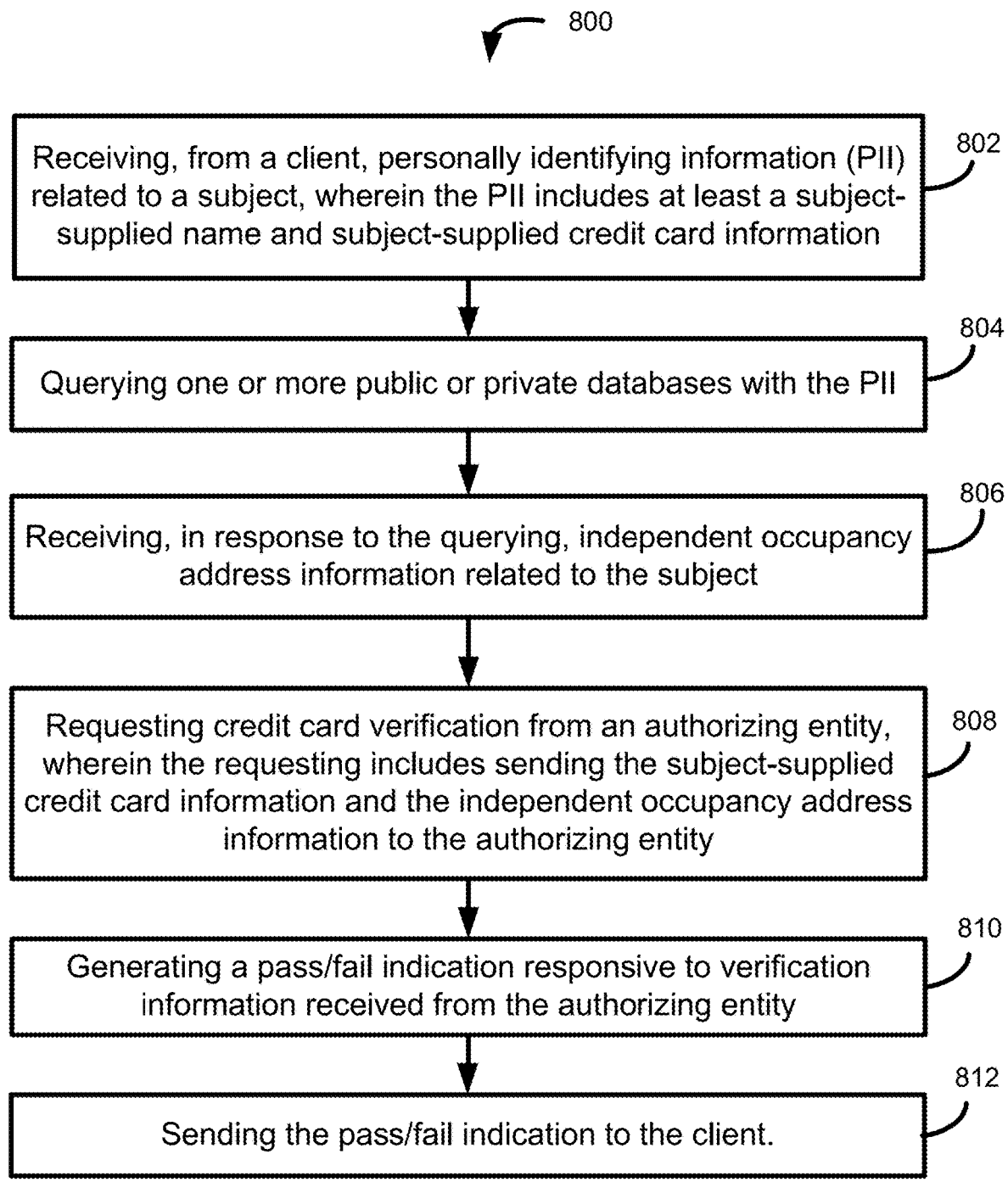
FIG. 8 is an example flow diagram of a method 800 for verifying a subject's identity, according to an example implementation of the disclosed technology.

FIG. 8 is an example flow diagram of a method 800 for verifying a subject's identity. The method 800 may be utilized to determine the subject's identity based on subject-supplied PII including credit card information, and independently determined occupancy address information related to the subject. The method 800 starts in block 802 and, according to an example implementation, includes receiving, from a client, personally identifying information (PII) related to a subject, wherein the PII includes at least a subject-supplied name and subject-supplied credit card information. In block 804, the method 800 includes querying one or more public or private databases with the PII. In block 806, the method 800 includes receiving, in response to the querying, independent occupancy address information related to the subject. In block 808, the method 800 includes requesting credit card verification from an authorizing entity, wherein the requesting includes sending the subject-supplied credit card information and the independent occupancy address information to the authorizing entity. In block 810, the method 800 includes generating a pass/fail indication responsive to verification information received from the authorizing entity. In block 812, the method 800 includes sending the pass/fail indication to the client.

In accordance with an example implementation of the disclosed technology, the PII further includes one or more of a subject-supplied address, phone number, date of birth, and a social security number.

Certain implementations may include performing initial identity verification of the subject based on the received PII, which may include one or more of: querying one or more public or private databases with the PII; receiving, in response to the querying, independent identity information related to the subject; generating an initial pass/fail indication responsive to a comparison of the PII and the received independent identity information related to the subject; and sending the initial pass/fail indication to the client.

In certain example implementations, the initial pass/fail indication is based at least in part on a determination of a predetermined level of consistency among the PII and the received independent identity information.

In accordance with an example implementation of the disclosed technology, the authorizing entity may include a credit card network, an issuing bank, and/or a third party authorization service.

In certain example implementations, receiving the independent occupancy address information can include receiving, as applicable, one or more of: utility records; evidence of commercial transaction behavior by the subject; credit bureau records; property deed records; property assessment records; social network records; public records of relatives; addresses of relatives; address history of relatives; addresses of colleagues; an indication of activity at an address of a second property by a previous resident of a target property; an indication of activity verifying the subject occupancy at the target property; and/or an indication of activity verifying non-occupancy by the subject at a previous address associated with the subject.

In certain example implementations, the independent occupancy address information related to the subject can include, as applicable, one or more of: drivers license information, vehicle registration information, utility information, voting information, criminal information, court information, property deed information, assessment information, tax information, sales information, and insurance information.

In accordance with an example implementation, the subject and property information may further include, as applicable, one or more of: one or more events associated with the address of the target property as of an investigation date, one or more current activities associated with the subject at the address of the target property, one or more current activities associated with the subject at a third property having an address that differs from the address of the target property, and/or one or more activities of relatives or associates of the subject at the address of the target property.

According to an example implementation, public records may include, as applicable, one or more of: drivers license information, vehicle registration information, utility information, voting information, criminal information, and court information; and wherein the property deed and tax assessment records include one or more of deed information, assessment information, tax information, sales information, and insurance information.

In certain example implementations of the disclosed technology, an indication of activity at the address of the second property by the previous resident of the target property may include, as applicable, one or more of: commercial transaction activity associated with the address of the second property, property deed and tax assessment records associated with the address of the second property, utility records associated with the address of the second property, and/or public records associated with the address of the second property.

According to an example implementation, an indication of activity verifying the subject occupancy at the target property may include, as applicable, one or more of: utility records associated with the subject, utility records associated with the address of the target property, records of seeking credit associated with the address of the target property, property deed and tax assessment records associated with the address of the target property, public records associated with the address of the target property, and/or records of relatives of the subject that are associated with the target property.

In certain example implementations of the disclosed technology, an indication of activity verifying non-occupancy by the subject at a previous address associated with the subject may include, as applicable: a record of sale of the previous address associated with the subject, public records that are no longer reporting subject activities associated with the previous address; lack of subject commercial transaction behaviors associated by the subject at the previous address, utilities at the previous address that are not associated with the subject, and/or relatives no longer associated with the previous address.

According to an example implementation, the one or more indicators of occupancy of the target property may further include, as applicable, one or more of: an indication of address verification of the target property, an indication of address verification of the previous property occupied by the subject, an indication that the target property was previously unoccupied, an indication that the subject moved to the target property, an indication that the subject moved from a previous property having an address that differs from the address of the target property, and/or an indication that a previous occupier of the target property moved from the target property to a property having an address that differs from the address of the target property.

Address Information Hygiene and Exclusions

According to an example implementation of the disclosed technology, it may be assumed that the identifying information 514 may include a valid name, address, etc. However, in certain embodiments, there may be issues with the identifying information that may result in faulty or no subject and property information 516 being returned in response to a query. For example, the address may be misspelled or so new that no records exist. In accordance with an example implementation, certain exclusions may be flagged or handled to, for example, remove misspelled addresses, invalid addresses, duplicate addresses, consolidate like addresses, consolidate dates, identify move-backs, and/or handle multiple distinct periods of residence for a single address. In certain example implementations of the disclosed technology, the address information may be cleaned and/or modified before performing the query. In another example implementation, the address information may be cleaned and/or modified after receiving back the subject and property information 516.

In accordance with certain example implementations, other exclusions may be flagged, such as records returned indicating no associated vehicle, property, voter, and driver's license records associated with the subject, combined with limited information such as a single source, single bureau, or single date in the public or private information that is returned.

In certain example implementations of the disclosed technology, tie-breakers may be applied, for example, to emphasize or give extra weight to certain subject and property information. For example, information that may be emphasized may include the most recent first seen and last seen dates for the subject information; an adequate number of vehicle, voter, driver's license records and phone records with last name match; confirmed identity of a buyer on the current deed record and the mailing address matches property address; an adequate number of non-bureau reporting sources; an adequate number of sources overall; more than one bureau source; and at least one non-bureau source reporting. Thus, in certain aspects of the disclosed technology, the identifying information 514 and/or the returned subject and property information 516 may be cleaned and/or updated as needed.

Occupancy Attributes and Indexes

In accordance with various example implementations of the disclosed technology, one or more processors (such as the processor(s) 606 in FIG. 6) may calculate an overall score, for example, to quantify the weight of evidence that a subject occupies a given address. Certain example implementations of the disclosed technology may return both occupancy attributes and indexes that score, weight, or otherwise, grade each of the occupancy attributes on scales indicative of occupancy. In certain example implementations, the indexes may be utilized to calculate an overall occupancy score indicating the weight of evidence that a given subject occupies a given address.

According to an example implementation, the occupancy attributes may include, or be based on one or more of:
 address reporting source;
 address reporting history;
 address search history;
 address utility history;
 address ownership history;
 address property type;
 address validity;
 relatives confirming address;
 address owner mailing address;
 prior address move;
 prior resident move;
 address date first seen;
 address date last seen;
 occupancy override;
 inferred ownership type;
 other owned property proximity; and/or
 occupancy score.

According to various example implementations of the disclosed technology, each of the abovementioned occupancy attributes may be further indexed with scores. For example, the address reporting source may be identified by possible index values such as (−1) subject not found; (0) no sources reporting target address for subject; (1) target property is most recently reported by at least one confirming source of public records only; (2) target property is most recently reported by less than three credit header records but no public records; (3) target property is most recently reported by all three credit header records but no public records; (4) target property is most recently reported by at least one source of public records and less than three credit header records; and (5) target property is most recently reported by at least one source of public records and all three credit header records.

In accordance with an example implementation, the address reporting source may represent the level of evidence from credit bureau records and public record data that the target property is/was the most recently reported property by the confirming sources for the subject. In accordance with an example implementation, this attribute may be scored or indexed by calculating from highest value to lowest level. In certain example embodiments, public records may be defined as any of the following: voter registration, driver's license, watercraft registration, vehicle registration, aircraft registration, and all court records including derogatory public records. According to certain example implementations, public records may exclude property deed and tax assessment records for purposes of the address reporting source occupancy attribute.

In accordance with an example implementation, the address reporting history may represent the level of evidence that the target property is/was the most recently reported address and a uniquely reported address for the subject based on the input date. According to an example implementation, this attribute may be indexed from the weakest value (for example, a 1 may represent that the property is not updating for the subject and another address is updating) to the strongest value (for example, a 7 may represent that the property is the only updating address for the subject).

In accordance with an example implementation, the address search history may represent the level of evidence of commercial transaction behavior confirming that a target property is associated with the subject. In an example implementation, this attribute may be indexed from the weakest value (for example, a 0 may represent no account opening searches for the subject within the last year) to the strongest value (for example, a 6 may represent recent account opening searches confirming the target address for the subject).

In accordance with an example implementation, the address utility history may represent the level of evidence of existing utility services for the subject at the target property. For example this attribute may be indexed from the weakest value (for example, a 1 may represent multiple utility services associated with a different property) to the strongest value (for example, a 7 may represent multiple utility services associated only with the target property.

In accordance with an example implementation, the address ownership represents the level of evidence of the subject's ownership of the target property based on the address deed and tax records. In an example implementation, this attribute may be indexed from the weakest value (for example, 1 may represent that target property ownership is associated with unrelated individual(s)) to the strongest value (for example, a 5 may represent that the target property ownership is only associated with the subject or spouse).

In accordance with an example implementation, the address property type may represent the target property dwelling type. In an example implementation, this attribute may differentiate between business, PO Box, multi-family, single family, or other dwelling types.

In accordance with an example implementation, the address validity may identify property characteristics for the target property indicating the likelihood of address occupancy. In an example implementation, this attribute may be indexed and reported from the weakest value (for example, a 1 may represent an invalid property address) to the highest value (for example, a 4 may represent that the property address is valid).

In accordance with an example implementation, the relatives confirming address attribute may represent the level of evidence of subject first degree related or associated identities reporting at the target address. In certain embodiments, this attribute may be indexed and reported from the weakest value (for example, a 1 may represent that subject-related identities were previously associated with the target property but not any longer) to the strongest value (for example, a 4 may represent that the subject-related identities are currently found at the address).

In accordance with an example implementation, the address owner mailing address attribute may represent the level of evidence that the deed or tax assessment mailing address matches the target property address. In an example implementation, this attribute may be indexed and reported from the weakest value (for example, a 1 may represent that the deed and/or tax assessment mailing address and target property address do not match) to the strongest value (for example, a 6 may represent a match between the deed and/or tax assessment mailing address and target property address).

In accordance with an example implementation, the prior address move attribute may represents the level of evidence that the subject recently moved and therefore is more likely to reside at the target property. In an example implementation, this attribute may be indexed and reported from the weakest value (for example, a 1 may represent that the subject owns their prior address with no evidence of movement) to the strongest value (for example, a 5 may represent that the subject sold his/her prior address).

In an example implementation, the prior resident move attribute may represent the level of evidence that the prior residents of the target property moved and therefore are unlikely to occupy the target property. In an example implementation, this attribute may be indexed and reported from the weakest value (for example, a 1 may represent that the prior residents own the property and show no evidence of movement) to the strongest value (for example, a 6 may represent that the prior residents sold target property and have bought a new property).

In an example implementation, the occupancy override attribute may represent whether evidence exists that the subject was deceased or incarcerated as of the input date.

In an example implementation, the inferred ownership type attribute represents the likely type of occupancy given that the subject owns the property. In an example implementation, this attribute may be indexed and reported from the weakest value (for example, a 1 may represent that the property is likely unoccupied) to the strongest value (for example, a 3 may represent that the property is likely a primary residence).

In an example implementation, the other owned property proximity attribute may represent the approximate distance in miles between the target property and the nearest additional property owned by the subject. This approximate value may be represented by index values representative of distance buckets of 0-10 miles, 10-50 miles, 50-100 miles, and over 100 miles away.

According to example implementations, certain technical effects can be provided, such as creating certain systems and methods that provide interested parties with a score indicating the likelihood that a particular subject is occupying a particular property or residence.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

As disclosed herein, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementations," "various implementations," "certain implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

APPENDIX

SALT

RELATIONSHIP:*relationshipname*:BASIS(*FieldList*):DEDUP(*FieldList*)
[:SCORE(*FieldList*)][:TRACK(FieldList)][:MULTIPLE(*n*)][:SPLIT(*n*)]
[:THRESHOLD(*n*)][:BLOCKTHRESHOLD(*n*)]

RELATIONSHIP:*relationshipname*:*RelationshipList*
[:MULTIPLE(*n*)] [:THRESHOLD(*n*)] [:BLOCKTHRESHOLD(*n*)]
[:LINK(NONE|ALL|DIRECT|CROSS)]

| | |
|---|---|
| *relationshipname* | User-specified logical name for an entity relationship to be computed in the relationship module |
| BASIS(*fieldlist*) | Specifies the basis for the relationship using the list of fields specified in the *fieldlist* parameter. The *fieldlist* contains a list of field names separated by a colon ':' character which must be equal between record pairs. Fields specified in the *fieldlist* following a :?: must be equal or null (left.field = right.field or left.field=null or right.field=null). Fields following a :-: implies the fields must not match. Fuzzy matching of fields is not currently supported. |
| DEDUP(*fieldlist*) | Specifies a list of field names separated by the colon ':' character for deduping when matching record pairs between clusters to compute the relationship count. The DEDUP prevents overcounting when a cluster contains multiple records containing equal basis fields. Typically the fieldlist is the same as the fixed portion of the BASIS fieldlist. DEDUP fields must be part of the BASIS. |
| SCORE(*fieldlist*) | Specifies an optional list of fields separated by the colon ':' character which will be independently scored once per relationship. Fields following a :-: will be negated for the purpose of computing the threshold. SCORE fields cannot be part of the BASIS. |
| TRACK(fieldlist) | Specifies an optional list of RECORDDATE fields, to be used for tracking the dates over which relationship information is gathered. |
| MULTIPLE(*n*) | Specifies the minimum number of entity links *n* which must occur before a relationship is declared. |

| | |
|---|---|
| **SPLIT(*n*)** | Specifies the number of different persists that the main relationship join is split into (default if not specified is 1). Can improve performance and reduce disk space utilization. |
| **THRESHOLD(*n*)** | In SALT relationships are scored the same as internal linking, the same internal linking match threshold must be exceeded for a relationship to be declared (counted). The default threshold is the global default for internal linking. The THRESHOLD(n) parameter allows the default value to be overridden. |
| **BLOCKTHRESHOLD(*n*)** | BLOCKTHRESHOLD can be used to override the default block threshold used to compute relationships (which is five less than the overall default threshold). Lower numbers = more matches and slower times. |
| LINK(NONE\|ALL\|DIRECT\|CROSS) | The LINK parameter is used to define how a given relationship is used to create link candidates for internal linking. The default is LINK(ALL). If LINK(NONE) is specified, the relationship will not take part in internal linking. If LINK(DIRECT) is specified, the relationship will cause the two sides of the relationship to be considered as possibly two halves of the same entity. If LINK(CROSS) is specified, then if D1 r D2 & D1 r D3, then Cross will cause D2 & D3 to be considered as possible entity link candidates. If LINK(All) is specified, both the DIRECT & CROSS options are evaluated. Note: the relationship basis will be used to SUPPORT the fields of the basis in the matching logic. Thus if you have a BASIS of (fname:lname) – then the NAME concept will be SUPPORTed by whatever the basis score is. This gives a way to get a very strong score for a field match if 2 (or more) relatively weak values for that field match between two entities. (For a fuller explanation of SUPPORT – see ATTRIBUTEFILE) |
| RelationshipList | The second form of the RELATIONSHIP statement allows a relationship to be formed as the sum of other relationships. The *RelationshipList* parameter allows a list of relationship names separated by the colon ':' character to be specified. |

SALT internal linking provides the capability to cluster together records to form an entity. In some situations, the objective is not to determine that two records or clusters are close enough to become part of the same entity, but to determine if a statistically significant link exists between the two clusters and to record this relationship. The RELATIONSHIP statement provides this function.

When clustering single entities using SALT internal linking, there may be insufficient information within one record to perform a link even with propagation of field values. SALT internal linking will leave those records unmatched. Relationships provide a way to record instances when multiple occurrences of specific set of fields (the BASIS field list) matching between clusters provide an additional clue that a match may exist. For example, when a name match isn't strong, but a first name, middle name and two different last names matching between clusters is becoming a lot stronger. Relationships are not currently used automatically as part of SALT linking, however using the RELATIONSHIP statement SALT can produce an additional relationship file that can be used to create an ATTRIBUTEFILE as input to another SALT process. For example, if you have a relationship between entity ID1 and ID2, the relationship file can be deduped and projected so that ID1☒ID2 and ID2☒ID1 are both in the file, then use an ATTRIBUTEFILE statement that declares one ID as the IDFIELD and the other ID as the VALUES field. See description below of the output format for a relationship file.

The core part of a SALT relationship is the BASIS; the basis is the list of fields which must be identical between two clusters for a linkage to exist. Fields following a :?: field in the basis field list must be identical or one must be null. Thus a relationship which counts and weighs the number of shared addresses between two clusters could be:

```
RELATIONSHIP:COHABIT:BASIS(PRIM_NAME:PRIM_RANGE:CITY_NAME:ST:?:SEC_RANGE)
```

Note that the sec-range comes after the :?: that defines that either they must be equal or one must be null.

You can also a ATTRIBUTEFILE VALUES field as part of the BASIS for a relationship.

As it stands this would count all of the record-pairs between two clusters which match, however if a cluster had two or more copies of an address it could double count. To avoid this issue you also specify a DEDUP criteria as a field list to dedup. It would be normal for the DEDUP criteria to be the same as the fixed portion of the basis. However for addresses there can often be multiple names for one road and multiple ways of expressing one city. Thus it is usually safest to simply dedup using the prim_range. For example:

```
RELATIONSHIP:COHABIT:BASIS(PRIM_NAME:PRIM_RANGE:CITY_NAME:ST:?:SEC_RANGE)
:DEDUP(PRIM RANGE)
```

It should be noted that the DEDUP performs a smart dedup, it will actually look for the strongest link found for a given value of a DEDUP field. In the example presented above, if a link had been found with and without the sec_range it will use the one which includes the sec-range value. If DEDUP is omitted, it defaults to the whole of the basis. SALT also checks to insure that all DEDUP elements are from the BASIS definition.

Within SALT relationship fields are scored the same as in internal linking and by default a linkage is declared if the internal linking match threshold is exceeded. This can be overridden using the THRESHOLD parameter on the RELATIONSHIP statement. As addresses usually have a specificity of around 28 it will generally then take 2 or more to cause a relationship to be declared. If you wish to force that a certain number of different links need to be found between clusters before declaring a relationship then you can use the :MULTIPLE($n$) option. Here $n$ is the minimum number of linkages that must have been found. A linkage occurs between any two entity identifiers which share a common value for a given basis.

Sometimes you want to be able to use other information in the record outside of the basis to support the declaration of a linkage but without requiring it as part of the basis. For example, sharing of one address between two identifiers is probably not significant but if the identifiers also share an SSN or share a last name there is more likelihood of a relationship. These supporting fields can be declared using the SCORE parameter on the RELATIONSHIP statement with its associated field list. For example:

```
RELATIONSHIP:COHABIT:BASIS(PRIM_NAME:PRIM_RANGE:CITY_NAME:ST:?:SEC_RANG
E):DEDUP(PRIM_RANGE):SCORE(SSN:LNAME)
```

The fields in the score list are independent and will be maximized across all of the linkages taking part in one relationship (if more than one RELATIONSHIP statement have the same field in the SCORE list, the highest score for that field will be used for all RELATIONSHIP statements).

An issue with relationships is getting them to run in a reasonable amount of time. Relationships are the classical n-squared process and the n-squared is true of both time and disk space. SALT does a lot of work to optimize this process which results in a light-weight self-joins being used in the generated ECL, but disk-space utilization could still be high. The SPLIT($n$) parameter on the RELATIONSHIP statement allows the core join to be split into parts each of which is persisted. This has the advantage of breaking a potentially very long join into n parts (allowing others a time slice) but also reduces disk consumption by a factor of $n$ (provided the eventual links are fairly sparse). In terms of performance it should be noted that if $n$ can be made high enough that the output of each join does not spill to disk then the relationship calculation process will have significantly faster performance. The following example shows the use of the SPLIT($n$) parameter:

```
RELATIONSHIP:COHABIT:BASIS(PRIM_NAME:PRIM_RANGE:CITY_NAME:ST:?:SEC_RANGE)
:SPLIT(16):SCORE(LNAME:SSN):DEDUP(PRIM RANGE)
```

It is possible to have multiple RELATIONSHIP statements defined in one specification file. Each RELATIONSHIP is independently computed. The output for the relationship specified will be in the following format:

```
CombinationRecord := RECORD
   unsigned6 ID1;
   unsigned6 ID2;
   unsigned2 Basis_score; // Score allocated to the basis relationship
   unsigned2 Dedup_Val;   // Hash will be stored in here to dedup
   unsigned2 Cnt; // Number of different basis matches shared between
```

```
      // clusters
   unsigned1 LNAME_score; // Independent score for the LNAME field
   unsigned1 SSN_score;   // Independent score for the SSN field
END;
```

*ID1* and *ID2* are the entity IDs being linked. The *Basis_score* is the accumulated score across all of the (deduped) basis matches that form the relationship. The *Dedup_Val* field is used for computation and may be ignored. *Cnt* is the number of different basis matches being used in the relationship. Then will come a score for each score field which has been maximized across all the basis matches in the relationship. The total score used to determine whether or not the matching threshold is exceeded is *Basis_score+Lname_score+SSN_score*.

Any field (BASIS or SCORE) which is part of a CONCEPT definition will be weighted appropriately when used inside BASIS or SCORE.

Relationships and Dates

It is possible to track the dates over which relationship information is gathered; provided you have RECORDDATE fields in your SPC. Any relationship can have a track list. TRACKing is there to provide date information about the relationship - it does NOT change the relationship computation in any way (other than possibly making it a little slower). For example:

```
RELATIONSHIP:COHABIT:BASIS(PRIM_NAME:PRIM_RANGE:CITY_NAME:ST:?:SEC_RANG
E):SCORE(LNAME:SSN):DEDUP(PRIM_RANGE):THRESHOLD(35):TRACK(dt_first_seen
:dt_last_seen)
RELATIONSHIP:CONAME:BASIS(FNAME:LNAME):MULTIPLE(2):TRACK(dt_first_seen:
dt_last_seen)
```

The system will then track for a 'first' date - the first date that BOTH elements of a relationship have a fact. For a 'last' date in is the last date that BOTH elements of a relationship share that fact. If a relationship is based upon multiple co-incidences it will find the earliest shared fact for a 'first' date and the latest shared fact for a last date. This is a slightly weird combination of mins and maxes - but semantically it works. As an example:

A lives at 123 Main Street from 19800101 to 19900101

B lives at 123 Main Street from 19850101 to 19870101

A lives at 456 High Street from 19900101 to 20000101

B lives at 456 High Street from 19870101 to 20100101

The system first computes the fact coincidence dates:

A&B share 123 Main Street from 19850101 to 19870101 (the shorter range when both are there)

A&B share 456 High Street from 19900101 to 200000101 (the shorter range when both are there)

Now the EARLIEST shared fact date is 19850101 and the latest shared fact date is 20000101.These represent an UPPER bound on the start of the relationship and a lower bound on the end of it.

NOTE: if shared facts do NOT overlap in time it is possible for the 'first' date to be after the 'last' date.

It is also possible to enforce some degree of date overlap within a single relationship. This is done by defining a RANGE field upon the two record dates. eg:

```
FIELD:dt_first_seen:RECORDDATE(FIRST,YYYYMM):5,0
FIELD:dt_last_seen:RECORDDATE(LAST,YYYYMM):5,0
RANGEFIELD:ReportedDate:RANGE(dt_first_seen,dt_last_seen):5,0
```

The two record-dates may be TRACKed if required (or not). ReportedDate can now be used as a (fairly) 'regular' field in the basis or score portion of a relationship. eg:

```
RELATIONSHIP:COHABIT:BASIS(PRIM_NAME:PRIM_RANGE:CITY_NAME:ST:?:SEC_RANG
E):SCORE(SSN:LNAME:REPORTEDDATE):DEDUP(PRIM_RANGE):THRESHOLD(35):TRACK(
dt_first_seen:dt_last_seen)
RELATIONSHIP:CONAME:BASIS(FNAME:LNAME:?:REPORTEDDATE):MULTIPLE(2):TRACK
(dt_first_seen)
RELATIONSHIP:COSSN:BASIS(SSN:REPORTEDDATE):SCORE(LNAME):THRESHOLD(35):T
RACK(dt_last_seen)
```

Notes:
1. In a score the Global specificity for a date overlap is used (same as in internal linking)
2. In the optional portion of a basis - the dates can overlap OR one record not have a date
3. In the fixed portion of a basis - there MUST be overlap in the dates. NOTE: A range field CANNOT be the ONLY (or FIRST) element of a basis

Combining Relationships with Different BASIS into a Single Relationship

It is also possible to define a relationship based upon other relationships. This is done using the relationship list. All relationships in the list must be normal relationships, grandparents are not allowed. This definition uses the second form of the RELATIONSHIP statement. Consider the following example which combines a COHABIT relationship with a COSSN relationship to form an association:

```
RELATIONSHIP:COHABIT:BASIS(PRIM_NAME:PRIM_RANGE:CITY_NAME:ST:?:SEC_RANGE)
:SPLIT(16):SCORE(LNAME:SSN):DEDUP(PRIM_RANGE):THRESHOLD(30)
RELATIONSHIP:COSSN:BASIS(SSN):SCORE(LNAME):DEDUP(SSN):MULTIPLE(2)
RELATIONSHIP:ASSOC:COHABIT:COSSN
```

This has two normal relationships and one that associates the other two together into a unified score. It should be noted that because the normal relationships are eventually going to be wired together by an association, you may need to weaken them as shown in the example using the THRESHOLD statement. Thus the THRESHOLD(30) on COHABIT may be enough to capture a very rare single address (40 is the typical person threshold in the LexisNexis person data). For COSSN the MULTIPLE(2) parameter forces pairs of matching SSN for a relationship; this is an efficiency gained from the fact that a single SSN match is already being caught be the SCORE on COHABIT.

In principle ASSOC then simply combines the two underlying relationships together and adds the scores; it is therefore very efficient and uses the stored results of the two normal relationships. However there is an issue in that between the child relationships there can easily be a lot of double-counting occurring because either:
  a) Two relationships have identical fields in the SCORE attribute (in this case both have LNAME)
  b) The SCORE attribute of one relationship might be part of the basis of another relationship (in this case COHABIT scores SSN which is part of the basis of COSSN)

SALT automatically picks this apart and:
  a) Only picks the best score when multiple SCOREs clash
  b) Assigns the SCORE from one relationship to the basis field of the other relationship and then does a MAX across those. (This is how a single SSN match gets picked up even though it is forbidden in COSSN).

Then the MULTIPLE and THRESHOLD parameters (or defaults) are applied to the child relationship. Thus a MULTIPLE(3) will require 3 different data matches to have occurred between COHABIT and COSSN.

A lot of the detail of the child relationships is preserved in the output generated for a combined relationship. The format for the ASSOC example would be:

```
shared ASSOCCRec := RECORD
    unsigned6 ID1;
    unsigned6 ID2;
    unsigned2 Total_Score := 0;
    unsigned2 Total_Cnt := 0;
    unsigned2 COHABIT_score := 0;
    unsigned1 COHABIT_cnt := 0;
    unsigned2 COSSN_score := 0;
    unsigned1 COSSN_cnt := 0;
    unsigned1 LNAME_score := 0;
    // Score for SSN will be rolled into COSSN as it is part of basis
  END;
```

Individual keys are also built by SALT for all relationships which are ot included as part of another relationship. In addition, a relationship service is built for each relationship that is not the child of another one. This service takes a UID (unique id) and a depth and will produce rolled up data for every relationship in the tree that many levels deep. The *tree walking* aspect of this service is in the *relationship_links* module. The tree is walked so that each level of the tree is joined to the branch before via the strongest link. At each level the ID1 is the node being walked from and the ID2 is the node being walked to. The original node appears as a level 0 entry in ID2.

For example, using the *Sample_Input_File_Internal_AF_Relationship_SPC* specification file in the SALT_Examples module for internal linking produces the following results:

| | | | | |
|---|---|---|---|---|
| Result 1 | [2 rows] | .zip .gz .xls | key::salt_test7::bdid::rel::cofein |
| Result 2 | [120 rows] | .zip .gz .xls | key::salt_test7::bdid::rel::assoc |
| Match Sample Records | [459 rows] | .zip .gz .xls | |
| Slice Out Candidates | [14 rows] | .zip .gz .xls | |
| Specificities | [1 rows] | .zip .gz .xls | |
| SPC Shift | [1 rows] | .zip .gz .xls | |
| Pre Clusters | [111 rows] | .zip .gz .xls | |
| Post Clusters | [111 rows] | .zip .gz .xls | |
| Pre Cluster Count | [1 rows] | .zip .gz .xls | |
| Post Cluster Count | [1 rows] | .zip .gz .xls | |
| Matches Performed | | | 305 |
| Basic Matches Performed | | | 132 |
| Slices Performed | | | 14 |
| Rule Efficacy | [7 rows] | .zip .gz .xls | |
| Confidence Levels | [73 rows] | .zip .gz .xls | |
| Propagation Assisted Pcnt | | | 17.04918032786885 |
| Propagation Required Pcnt | | | 5.973770491803279 |
| Pre Pop Stats | [1 rows] | .zip .gz .xls | |
| Post Pop Stats | [1 rows] | .zip .gz .xls | |
| Validity Statistics | [1 rows] | .zip .gz .xls | |
| Id Consistency0 | [1 rows] | .zip .gz .xls | |
| Result 22 | [1 rows] | .zip .gz .xls | key::salt_test7::bdid::debug::specificities_debug |
| Result 23 | [148375 rows] | .zip .gz .xls | key::salt_test7::bdid::debug::match_candidates_debug |
| Result 24 | [152 rows] | .zip .gz .xls | key::salt_test7::bdid::datafile::attribute_matches |
| Result 25 | [437 rows] | .zip .gz .xls | key::salt_test7::bdid::debug::match_sample_debug |
| Result 26 | [148375 rows] | .zip .gz .xls | key::salt_test7::bdid::datafile::patched_candidates |
| Result 27 | [151475 rows] | .zip .gz .xls | temp::bdid::salt_test7::it1 |
| Result 28 | [6625 rows] | .zip .gz .xls | temp::bdid::salt_test7::changes_it1 |

Result 1 is the file produced by the COFEIN relationship. This file contains the following results:

| | bdid1 | bdid2 | basis score | dedup val | cnt | company name score |
|---|---|---|---|---|---|---|
| 1 | 37178850 | 292680203 | 22 | 54286 | 2 | 11 |
| 2 | 292680203 | 37178850 | 22 | 54286 | 2 | 11 |

Result 2 is the file produced by the top-level relationship called ASSOC. contains the following results:

| | bdid1 | bdid2 | colocate score | colocate cnt | cofein score | cofein cnt | company name score | total cnt | total score |
|---|---|---|---|---|---|---|---|---|---|
| 1 | 28318440 | 81815873 | 12 | 1 | 0 | 0 | 11 | 1 | 23 |
| 2 | 37178850 | 292680203 | 0 | 0 | 22 | 2 | 11 | 2 | 33 |
| 3 | 41434192 | 42443948 | 13 | 1 | 0 | 0 | 11 | 1 | 24 |
| 4 | 42443948 | 41434192 | 13 | 1 | 0 | 0 | 11 | 1 | 24 |
| 5 | 81815873 | 28318440 | 12 | 1 | 0 | 0 | 11 | 1 | 23 |
| 6 | 82061141 | 286051048 | 9 | 1 | 11 | 0 | 8 | 1 | 28 |
| 7 | 176223914 | 387318952 | 12 | 1 | 0 | 0 | 11 | 1 | 23 |
| 8 | 286051048 | 82061141 | 9 | 1 | 11 | 0 | 8 | 1 | 28 |
| 9 | 292680203 | 37178850 | 0 | 0 | 22 | 2 | 11 | 2 | 33 |
| 10 | 387318952 | 176223914 | 12 | 1 | 0 | 0 | 11 | 1 | 23 |
| 11 | 408311407 | 408973906 | 12 | 1 | 0 | 0 | 11 | 1 | 23 |
| 12 | 408973906 | 408311407 | 12 | 1 | 0 | 0 | 11 | 1 | 23 |
| 13 | 427653229 | 994817609 | 10 | 1 | 11 | 0 | 4 | 1 | 25 |
| 14 | 994817609 | 427653229 | 10 | 1 | 11 | 0 | 4 | 1 | 25 |

I claim:

1. A computer-implemented method comprising:
receiving, from a client, a subject-supplied credit card number and personally identifying information (PII) related to a subject responsive to a credit card transaction request, wherein the PII includes at least a subject-supplied name and a subject-supplied mailing address;
resolving the PII;
determining, with a computing device of an occupancy determination system, and based on resolved PII, identification (ID) information that uniquely identifies the subject;
querying one or more public or private databases with the ID information;
determining, in response to the querying, an independently determined mailing address of the subject, wherein the independently determined mailing address is independently determined from the PII received from the client;
requesting credit card mailing address verification from an authorizing entity, wherein the requesting includes sending one or more of the subject-supplied credit card number and the independently determined mailing address to the authorizing entity;
receiving, from the authorizing entity, verification information comprising an indication of a match/mismatch between the independently determined mailing address and an address associated with the subject-supplied credit card number;
generating a pass/fail indication responsive to the verification information received from the authorizing entity without requiring hardware in addition to the computing device; and
sending the pass/fail indication to the client.

2. The method of claim 1, wherein the PII further includes one or more of a subject-supplied phone number, date of birth, and a social security number.

3. The method of claim 1, wherein the authorizing entity comprises one or more of:
a credit card network;
an issuing bank; and
a third party authorization service.

4. The method of claim 1, wherein receiving the independently determined mailing address includes receiving, as applicable, one or more of:
utility records;
evidence of commercial transaction behavior by the subject;
credit bureau records;
property deed records;
property assessment records;
social network records;
public records of relatives;
addresses of relatives;
address history of relatives;
an indication of activity at an address of a second property by a previous resident of a target property;
an indication of activity verifying occupancy by the subject at the target property; and
an indication of activity verifying non-occupancy by the subject at a previous address associated with the subject.

5. The method of claim 1, wherein the independently determined mailing address related to the subject includes, as applicable, one or more of: driver's license information, vehicle registration information, utility information, voting information, criminal information, court information, property deed information, assessment information, tax information, sales information, and insurance information.

6. A system comprising:
a memory for storing data and computer-executable instructions; and
at least one processor configured to access the at least one first memory, wherein the at least one processor is further configured to execute the computer-executable instructions to cause the system to perform a method comprising:
receiving, from a client, a subject-supplied credit card number and personally identifying information (PII) related to a subject responsive to a credit card transaction request, wherein the PII includes at least a subject-supplied name and a subject-supplied mailing address;
resolving the PII;
determining, with the at least one processor and based on resolved PII, identification (ID) information that uniquely identifies the subject;
querying one or more public or private databases with the ID information;
determining, in response to the querying, an independently determined mailing address of the subject, wherein the independently determined mailing address is independently determined from the PII received from the client;
requesting credit card mailing address verification from an authorizing entity, wherein the requesting includes sending one or more of the subject-supplied credit card number and the independently determined mailing address to the authorizing entity;
receiving, from the authorizing entity, verification information comprising an indication of a match/mismatch between the independently determined mailing address and an address associated with the subject-supplied credit card number;
generating a pass/fail indication responsive to the verification information received from the authorizing entity without requiring hardware in addition to the at least one processor; and
sending the pass/fail indication to the client.

7. The system of claim 6, wherein the PII further includes one or more of a subject-supplied phone number, date of birth, and a social security number.

8. The system of claim 6, wherein generating the pass/fail indication is based at least in part on the independently determined mailing address matching the subject-supplied mailing address.

9. The system of claim 6, wherein the authorizing entity comprises one or more of:
a credit card network;
an issuing bank; and
a third party authorization service.

10. The system of claim 6, wherein receiving the independently determined mailing address includes receiving, as applicable, one or more of:
utility records;
evidence of commercial transaction behavior by the subject;
credit bureau records;
property deed records;
property assessment records;
social network records;
public records of relatives;
addresses of relatives;
address history of relatives;

an indication of activity at an address of a second property by a previous resident of a target property;

an indication of activity verifying occupancy by the subject at the target property; and an indication of activity verifying non-occupancy by the subject at a previous address associated with the subject.

11. The system of claim 6, wherein the independently determined mailing address related to the subject includes, as applicable, one or more of: driver's license information, vehicle registration information, utility information, voting information, criminal information, court information, property deed information, assessment information, tax information, sales information, and insurance information.

12. A non-transient computer-readable medium storing instructions, that when executed by a computing device having one or more processors, cause the one or more processors to perform a method comprising:

receiving, from a client, a subject-supplied credit card number and personally identifying information (PII) related to a subject responsive to a credit card transaction request, wherein the PII includes at least a subject-supplied name and a subject-supplied mailing address;

resolving the PII;

determining, with a computing device of an occupancy determination system, and based on resolved PII, identification (ID) information that uniquely identifies the subject;

querying one or more public or private databases with the ID information;

determining, in response to the querying, an independently determined mailing address of the subject, wherein the independently determined mailing address is independently determined from the PII received from the client;

requesting credit card mailing address verification from an authorizing entity, wherein the requesting includes sending one or more of the subject-supplied credit card number and the independently determined mailing address to the authorizing entity;

receiving, from the authorizing entity, verification information comprising an indication of a match/mismatch between the independently determined mailing address and an address associated with the subject-supplied credit card number;

generating a pass/fail indication responsive to the verification information received from the authorizing entity without requiring hardware in addition to the computing device; and sending the pass/fail indication to the client.

13. The non-transient computer-readable medium of claim 12, wherein the PII further includes one or more of a subject-supplied phone number, date of birth, and a social security number.

14. The method of claim 1, further comprising:

generating an initial pass/fail indication responsive to a comparison of the subject supplied mailing address and the independently determined mailing address.

15. The method of claim 14, wherein generating the initial pass/fail indication is based at least in part on the independently determined mailing address matching the subject-supplied mailing address.

16. The method of claim 14, wherein the pass/fail indication is generated responsive to the initial pass/fail indication and the verification information received from the authorizing entity.

17. The method of claim 1, wherein resolving the PII comprises one or more of:

discarding a portion of the PII;

detecting and removing one or more errors in the PII; and eliminating a duplicate ID.

18. The method of claim 1, further comprising denying or approving the credit card transaction request responsive to the generated pass/fail indication.

\* \* \* \* \*